(12) United States Patent
Sun et al.

(10) Patent No.: US 12,443,841 B2
(45) Date of Patent: Oct. 14, 2025

(54) FOUR-BIT TRAINING FOR MACHINE LEARNING

(71) Applicant: International Business Machines Corporation, Armonk, NY (US)

(72) Inventors: Xiao Sun, Pleasantville, NY (US); Ankur Agrawal, Chappaqua, NY (US); Kailash Gopalakrishnan, New York, NY (US); Naigang Wang, Ossining, NY (US); Chia-Yu Chen, White Plains, NY (US); Jiamin Ni, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 17/112,528

(22) Filed: Dec. 4, 2020

(65) Prior Publication Data

US 2022/0180171 A1  Jun. 9, 2022

(51) Int. Cl.
| | |
|---|---|
| *G06N 3/08* | (2023.01) |
| *G06F 7/499* | (2006.01) |
| *G06F 17/16* | (2006.01) |
| *G06N 3/063* | (2023.01) |

(52) U.S. Cl.
CPC ............... *G06N 3/08* (2013.01); *G06F 7/499* (2013.01); *G06F 17/16* (2013.01); *G06N 3/063* (2013.01)

(58) Field of Classification Search
CPC .......... G06N 3/063; G06N 3/08; G06N 3/084; G06F 7/4876; G06F 7/499; G06F 7/5443; G06F 2207/4824
See application file for complete search history.

(56) References Cited

U.S. PATENT DOCUMENTS

| | | |
|---|---|---|
| 8,874,794 B2 | 10/2014 | Wegener |
| 9,400,635 B1 | 7/2016 | Czajkowski |
| 10,402,168 B2 | 9/2019 | Hasenplaugh et al. |

(Continued)

OTHER PUBLICATIONS

Banner, Ron, Yury Nahshan, and Daniel Soudry. "Post training 4-bit quantization of convolutional networks for rapid-deployment." Advances in Neural Information Processing Systems 32 (2019). (Year: 2019).*

(Continued)

*Primary Examiner* — Matthew D Sandifer
(74) *Attorney, Agent, or Firm* — Teddi Maranzano; Otterstedt & Kammer PLLC

(57) ABSTRACT

An apparatus includes a floating-point gradient register; an integer register; a memory bank; and an array of processing units. Each of the units includes a plurality of binary shifters having an integer input configured to obtain corresponding bits of a 4-bit integer multiplicand, and a shift-specifying input configured to obtain corresponding bits in an exponent field of a 4-bit floating point multiplier. The multiplier is specified in a mantissaless four-bit floating point format including a sign bit, three exponent bits, and no mantissa bits. An adder tree has a plurality of inputs coupled to outputs of the plurality of shifters, and a rounder has an input coupled to an output of the adder tree. The integer inputs are connected to the integer register; the shift-specifying inputs are connected to the floating-point gradient register; and outputs of the rounders are coupled to the memory bank.

18 Claims, 13 Drawing Sheets

(56) References Cited

U.S. PATENT DOCUMENTS

| | | | |
|---|---|---|---|
| 10,592,208 | B2 | 3/2020 | Wang et al. |
| 10,713,013 | B1 | 7/2020 | Old |
| 10,756,754 | B2 | 8/2020 | Rovers |
| 12,033,237 | B2 | 7/2024 | Mellempudi et al. |
| 2017/0147288 | A1 | 5/2017 | Hilker |
| 2018/0307971 | A1 | 10/2018 | Sinha et al. |
| 2018/0308201 | A1 | 10/2018 | Appu et al. |
| 2018/0322382 | A1 | 11/2018 | Mellempudi et al. |
| 2018/0322607 | A1 | 11/2018 | Mellempudi et al. |
| 2019/0236436 | A1 | 8/2019 | Imber et al. |
| 2020/0174750 | A1 | 6/2020 | Langhammer |
| 2020/0201602 | A1 | 6/2020 | Felix et al. |
| 2020/0225948 | A1 | 7/2020 | Sim et al. |
| 2020/0242474 | A1 | 7/2020 | Lo et al. |
| 2021/0064976 | A1 | 3/2021 | Sun et al. |
| 2021/0232407 | A1* | 7/2021 | Liu ............... H03M 7/6005 |
| 2024/0086152 | A1* | 3/2024 | Gandolfi ............ G06F 7/5443 |
| 2024/0160406 | A1* | 5/2024 | Venkatesan .......... G06F 7/4876 |

OTHER PUBLICATIONS

Y. Choukroun, E. Kravchik, F. Yang and p. Kisilev, "Low-bit Quantization of Neural Networks for Efficient Inference," 2019 IEEE/CVF International Conference on Computer Vision Workshop (ICCVW), Seoul, Korea (South), 2019, pp. 3009-3018. (Year: 2019).*

Tambe et al.; "AdaptiveFloat: A Floating-Point Based Data Type For Resilient Deep Learning Inference", Cornell University Library, arXiv:1909.13271v3,pp. 1-13,Feb. 11, 2019.

Han et al.; "Auto-Precision Scaling For Distributed Deep Learning", Cornell University Library, arXiv:1911.08907v1, pp. 1-10, Nov. 20, 2019.

DiCecco, Roberto; Caffeinated FPGAs: FPGA Framework For Training And Inference Of Convolutional . . . Floating-Point Arithmetic, University Of Toronto, pp. 1-86, Jun. 2018.

Lu et al.; "Training Deep Neural Networks Using Posit Number System", Cornell University Library, arXiv:1909.03831v1, pp. 1-6, Sep. 6, 2019.

Gysel, Matthias Phillip; "Ristretto: Hardware-Oriented Approximation Of Convolutional Neural Networks", arXiv:1605.06402v1, pp. 1-73, May 20, 2016.

Xiao Sun, Naigang Wang, Chia-Yu Chen, Jiamin Ni, Ankur Agrawal, Xiaodong Cui, Swagath Venkataramani, Kaoutar El Maghraoui, Vijayalakshmi (Viji) Srinivasan, Kailash Gopalakrishnan, Ultra-Low Precision 4-bit Training of Deep Neural Networks, Advances in Neural Information Processing Systems 33 pre-proceedings (NeurIPS 2020), made available on-line on Nov. 6, 2020, pp. 1-12 (Grace Period Disclosure).

Thierry Tambe et al., Adaptivfloat: a Floating-Point BA SED Data Type for Resilient Deep Learning Inference Feb. 11, 2020 pp. 13 arXiv preprint arXiv:1909.13271.

Jinming Lu et al., Training Deep Neural Networks Using Posit Number System Sep. 6, 2019 pp. 6 In2019 32nd IEEE International System-on-Chip Conference (SOCC).

Ron Banner, Itay Hubara, Elad Hoffer, and Daniel Soudry. Scalable methods for 8-bit training of neural networks. In Advances in neural information processing systems, pp. 5145-5153, Jun. 17, 2018.

Daisuke Miyashita, Edward H Lee, and Boris Murmann. Convolutional neural networks using logarithmic data representation. arXiv preprint arXiv:1603.01025, Mar. 17, 2016 10 pages.

Xiao Sun, Jungwook Choi, Chia-Yu Chen, Naigang Wang, Swagath Venkataramani, Vijayalakshmi Viji Srinivasan, Xiaodong Cui, Wei Zhang, and Kailash Gopalakrishnan. Hybrid 8-bit floating point (hfp8) training and inference for deep neural networks. In Advances in Neural Information Processing Systems, pp. 4901-4910, 2019.

Naigang Wang, Jungwook Choi, Daniel Brand, Chia-Yu Chen, and Kailash Gopalakrishnan. Training deep neural networks with 8-bit floating point numbers. In Advances in neural information processing systems, pp. 7675-7684, Dec. 19, 2018.

Paulius Micikevicius, Sharan Narang, Jonah Alben, Gregory Diamos, Erich Elsen, David Garcia, Boris Ginsburg, Michael Houston, Oleksii Kuchaiev, Ganesh Venkatesh, et al. Mixed precision training. arXiv preprint arXiv:1710.03740, 2017. Feb. 15, 2018.

Steven K. Esser, Jeffrey L. Mckinstry, Deepika Bablani, Rathinakumar Appuswamy, and Dharmendra S. Modha. Learned step size quantization. CoRR, abs/1902.08153, 2019. URL http://arxiv.org/abs/1902.08153. May 7, 2020 12 pages.

Jungwook Choi, Zhuo Wang, Swagath Venkataramani, Pierce I-Jen Chuang, Vijayalakshmi Srinivasan, and Kailash Gopalakrishnan. Pact: Parameterized clipping activation for quantized neural networks. arXiv preprint arXiv:1805.06085, Jul. 17, 2018.

Jungwook Choi, Swagath Venkataramani, Vijayalakshmi Srinivasan, Kailash Gopalakrishnan, Zhuo Wang, and Pierce Chuang. Accurate and efficient 2-bit quantized neural networks. In Proceedings of the 2nd SysML Conference, 2019. 12 pages.

ResNet-18 convolutional neural network, 4 pages downloaded Jul. 9, 2024 from https://www.mathworks.com/help/deeplearning/ref/resnet18.html.

CIFAR-10 and CIFAR-100 datasets, 3 pages downloaded Jul. 9, 2024 from https://www.cs.toronto.edu/~kriz/cifar.html.

NVIDIA/apex A PyTorch Extension: Tools for easy mixed precision and distributed training in Pytorch 5 pages downloaded Jul. 9, 2024 from https://github.com/NVIDIA/apex.

ImageNet 1 page downloaded Jul. 9, 2024 from https://www.image-net.org/.

What is ResNet-50? 7 pages downloaded Jul. 9, 2024 from https://blog.roboflow.com/what-is-resnet-50/#:~:text=One%20such%20 . . .

Why GEMM is at the heart of deep learning » Pete Warden's blog, Apr. 20, 2015 By Pete Warden in Uncategorized Comments, 13 pages downloaded Jul. 9, 2024 from https://petewarden.com/2015/04/20/why-gemm-is-at-the-heart-of-deep - . . . .

* cited by examiner

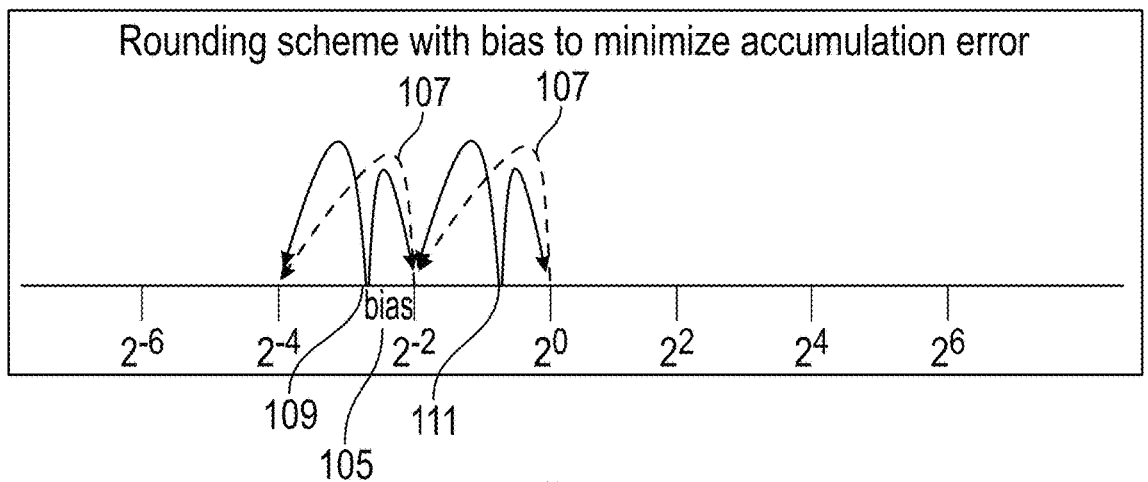
FIG. 3
- Clipping
    All numbers larger than $2^6$ will be $2^6$
    All numbers less than $2^{-6}$ will be 0
- Rounding off the radix 2 exponent to radix 4 stochastically
    For $e_{FP32} = \log_2(x_{FP32})$ in range $[a, a+2]$, $a$ in $\{-6,-4,-2,0,2,4\}$
    Generate a random number between $[0,1]$, $e_{rand}$
    if $F(e_{FP32}-a) > e_{rand}$, $x_{FP4} = 2^{a+2}+2$, else $2^a$
    $F(x) = \frac{(2^x-1)}{3}$ can make $\mathbb{E}(x_{FP4}) = x_{FP32}$
FIG. 4
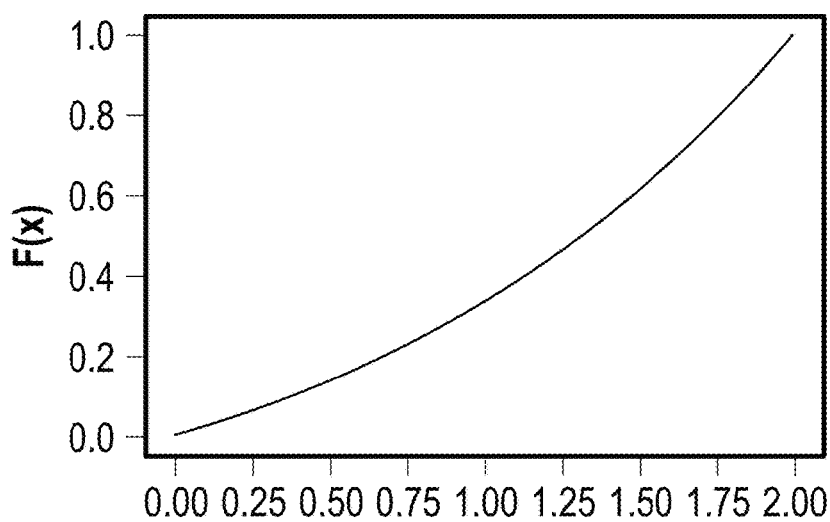
FIG. 5

$$R_{\{f16\}} = \sum_{k=1}^{n} X_{k\{f4\}} * Y_{k\{i4\}}$$

Xk_{odd_phase} is 0.5 * Xk_{even_phase}
Thus R_{odd_phase} = 0.5 * R_{even_phase}

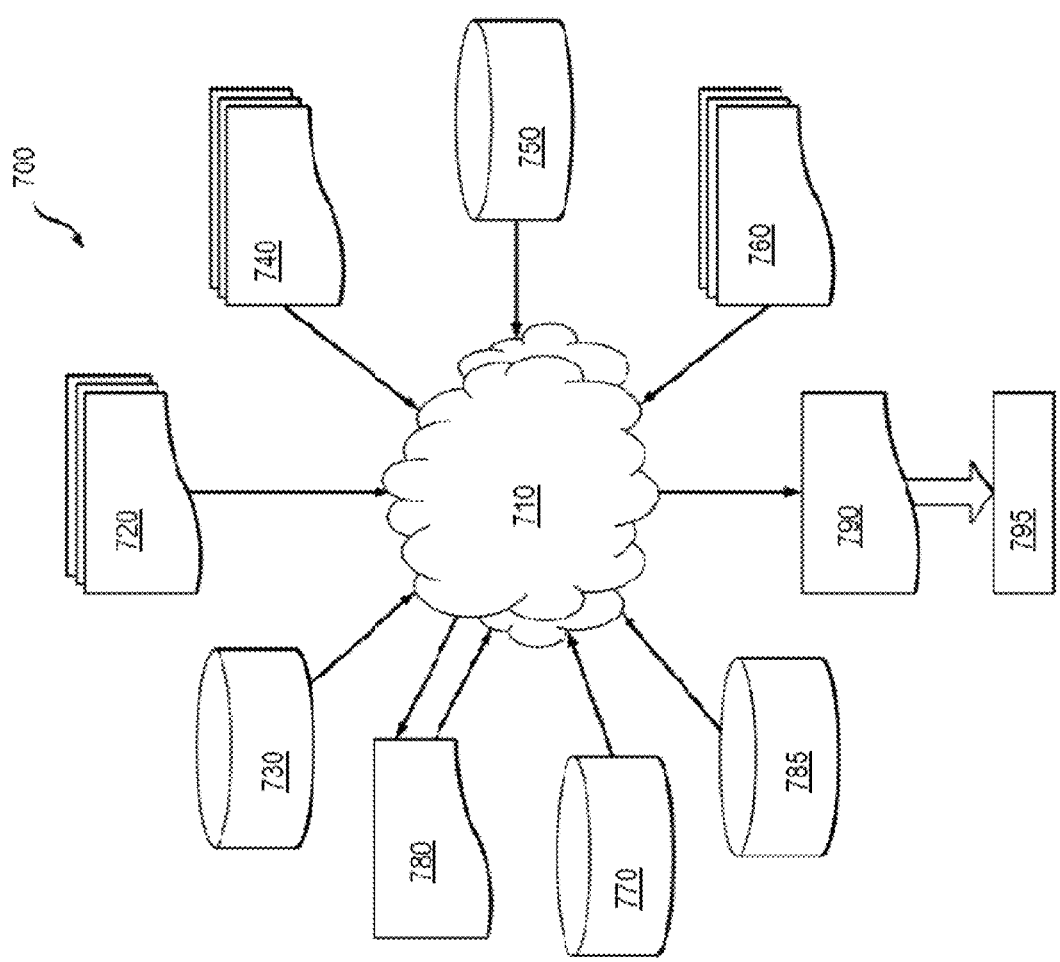

FOUR-BIT TRAINING FOR MACHINE LEARNING

STATEMENT REGARDING PRIOR DISCLOSURES BY THE INVENTOR OR A JOINT INVENTOR

The following disclosure(s) are submitted under 35 U.S.C. 102(b)(1)(A):

Xiao Sun, Naigang Wang, Chia-Yu Chen, Jiamin Ni, Ankur Agrawal, Xiaodong Cui, Swagath Venkataramani, Kaoutar El Maghraoui, Vijayalakshmi (Viji) Srinivasan, Kailash Gopalakrishnan, Ultra-Low Precision 4-bit Training of Deep Neural Networks, Advances in Neural Information Processing Systems 33 pre-proceedings (NeurIPS 2020), made available on-line on Nov. 6, 2020.

BACKGROUND

The present invention relates to the electrical, electronic and computer arts, and more specifically, to circuits and techniques for implementing machine learning systems and the like.

Neural networks are used to carry out machine learning. A computer learns to perform some task by analyzing training examples. Typically, the examples have been hand-labeled in advance by a human expert. A neural network includes thousands or even millions of simple processing nodes that are densely interconnected. Training a neural network involves using an optimization algorithm to find a set of weights to best map inputs to outputs. Training of neural networks is computationally expensive. To reduce computational expense, training of neural networks has entered low precision domains such as 8-bit floating point (FP8).

SUMMARY

Principles of the invention provide techniques for four-bit training for machine learning. In one aspect, an exemplary apparatus includes a floating-point gradient register; an integer register; a memory bank; and an array of processing units having M rows and N columns. Each of the processing units in turn includes a plurality of binary shifters, each having an integer input configured to obtain corresponding bits of a 4-bit integer multiplicand, a shift-specifying input configured to obtain corresponding bits in an exponent field of a 4-bit floating point multiplier, the multiplier being specified in a mantissaless four-bit floating point format including a sign bit, three exponent bits, and no mantissa bits, and an output. The apparatus further includes an adder tree having a plurality of inputs coupled to the outputs of the plurality of shifters, and having an output; and a rounder having an input coupled to the output of the adder tree and having an output. the integer inputs of the processing units are connected to the integer register; the shift-specifying inputs of the processing units are connected to the floating-point gradient register; and the outputs of the rounders are coupled to the activation function unit.

In some cases, the apparatus further includes a conversion unit intermediate the outputs of the rounders and the memory bank; in some such cases, the apparatus further includes an activation function unit intermediate the outputs of the rounders and the conversion unit; in some such cases, the processing units are configured to perform multiplication of the multiplicand and the multiplier using only the plurality of binary shifters, and without use of digital multiplier circuits.

Further, in some cases, each of the rounders further includes a normalizer and a pack circuit, and the rounders are configured to output floating-point numbers. In some such cases, each of the rounders includes: a normalizer-rounder block having the input of the rounder, an exponent output, a sign output, and a mantissa output; a pack circuit having an exponent input, a sign input coupled to the sign output of the normalizer-rounder block, and a mantissa input coupled to the mantissa output of the normalizer-rounder block; a multiplexer having an even input coupled to the exponent output of the normalizer-rounder block, an odd input, an output coupled to the exponent input of the pack circuit, and an even/odd phase select input, the multiplexer being configured to select, for output to the pack circuit, the even input when the phase select input is a first value and the odd input when the phase select input is a first value; and a decrementer coupled between the exponent output of the normalizer-rounder block and the odd input of the multiplexer, the decrementer being configured to decrement an input by one.

In another aspect, an exemplary processing element includes a plurality of binary shifters, each having an integer input configured to obtain corresponding bits of a 4-bit integer multiplicand, a shift-specifying input configured to obtain corresponding bits in an exponent field of a 4-bit floating point multiplier, the multiplier being specified in a mantissaless four-bit floating point format including a sign bit, three exponent bits, and no mantissa bits, and an output; an adder tree having a plurality of inputs coupled to the outputs of the plurality of shifters, and having an output; and a rounder having an input coupled to the output of the adder tree and having an output.

In still another aspect, an exemplary method for training a computer-implemented neural network includes accessing a first portion of training data for a neural network in a mantissaless four-bit floating point format including a sign bit, three exponent bits, and no mantissa bits, the training data initially being in a higher-precision format than the four-bit format; accessing a second portion of the training data for the neural network in a four-bit integer format; training a computerized neural network on the first portion of the training data represented in the mantissaless four-bit format and the second portion of the training data represented in the four-bit integer format, wherein the training includes multiplying four-bit integers in the second portion of the training data by numbers in the first portion of the training data represented in the mantissaless four-bit floating point format, and adding results of the multiplying, wherein the multiplying and adding are carried out with digital shifter and adder circuitry and without use of digital multiplier circuits; and deploying the computerized neural network, trained on the first and second portions of the training data.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in hardware such as digital circuitry. This digital circuitry can then be used in a computer to train/execute machine learning software in a computationally efficient manner. The machine learning software can be implemented in the form of a computer program product including a computer readable storage medium with computer usable program code for performing the method steps indicated. The software can then be executed on a system (or apparatus) including a memory, and at least one processor that is coupled to the memory and operative to perform exemplary machine learning training and inference; the processor can be configured as described herein.

Techniques of the present invention can provide substantial beneficial technical effects. For example, one or more embodiments provide the ability to use 4-bit training on neural networks with many benefits including 4-7 times enhancement in power efficiency over 16-bit training and significant reduction of energy cost and chip areas. Enhancement in power efficiency in turn leads to faster execution times because, for the same power budget, more processors can be executed in parallel.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 shows an exemplary "even" quantization method from FP32 to FP4(1-3-0, radix4), according to an aspect of the invention;

FIG. 4 and FIG. 5 show an exemplary stochastic quantization method from FP32 to FP4(1-3-0, radix4), according to an aspect of the invention;

FIG. 22 is a flow diagram of a design process used in semiconductor design, manufacture, and/or test.

DETAILED DESCRIPTION

Figure 1:
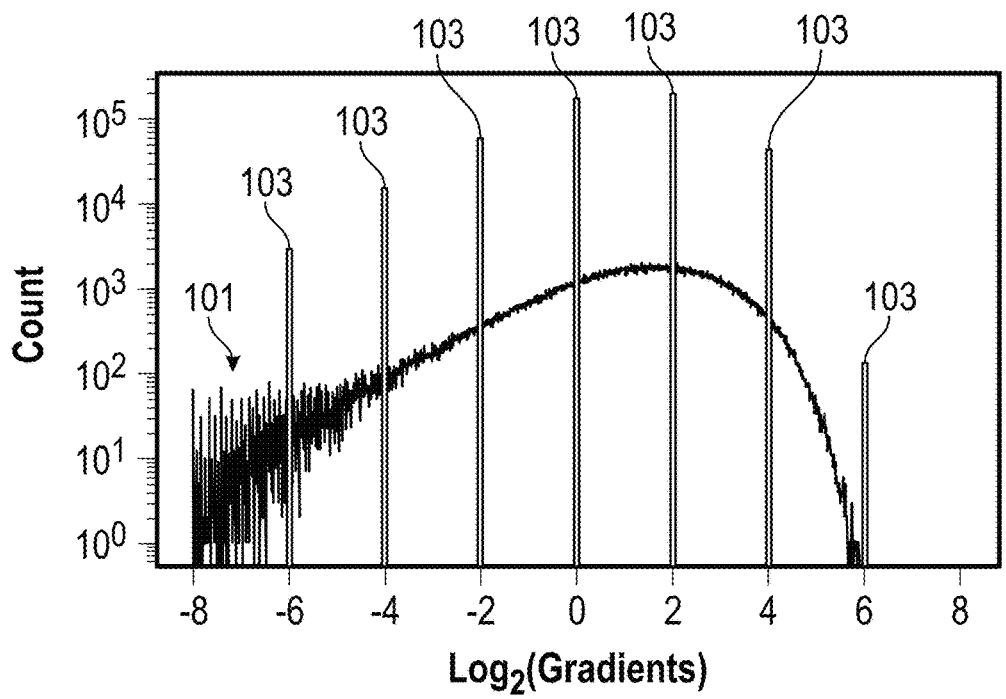
FIG. 1 depicts gradients of activations in one layer of an exemplary dataset which are quantized into levels in a four-bit floating point format, according to an aspect of the invention.

As noted, training of neural network has entered low precision domains such as 8-bit floating point (FP8). We have found that promising results can be obtained for more aggressive 4-bit training using the floating point (FP) format for backwards gradients and the 4-bit integer (INT4) format for weights and forward activations. To run this 4-bit training, one or more embodiments provide a novel hardware design accumulating INT4×FP4 products.

In one aspect, a new FP4:1-3-0 (1-3-0=one bit for the sign—three bits for the exponent—no mantissa bits) 4-bit format is used for backward gradients, with a non-conventional radix. As will be appreciated by the skilled artisan, in a positional numeral system, the radix or base is the number of unique digits, including the digit zero, used to represent numbers. For example, for the decimal system, the radix (base number) is ten, dictating that each character represents the value of $10^n$ with the n as the position relative to the radix point (decimal point if the radix is 10); for example, $10.1_{10}=1\times10^1+0\times10^0+1\times10^{-1}$, while for the binary system, the radix is two and the same number will express the value of $10.1_2=1\times2^1+0\times2^0+1\times2^{-1}=2.5$. Instead of radix 2 used by all current floating-point formats, one or more embodiments use radix 4 to cover a larger range, for example, $10.1_4=1\times4^1+0\times4^0+1\times4^{-1}=6.0$. Furthermore in this regard, although one or more embodiments adopt radix 4, a character in accordance with aspects of the invention still only contains 0 and 1 (binary hardware) except that using base four gives them a larger value. In some sense, this is an incomplete numbering system, but it is advantageous in one or more embodiments since there are no mantissa bits, as discussed herein.

Further, one or more embodiments provide techniques to quantize high precision numbers to the inventive FP4 format with minimized quantization errors. Even further, one or more embodiments provide hardware that performs INT4× FP4 multiplication and add for DNN training, with INT4 activations/weights for forward training and the FP4 gradients as disclosed herein for backward training. Normal floating-point representations have mantissa bits. In contrast, one or more embodiments, as noted, have no mantissa bits (thus the zero in 1-3-0). Current floating-point techniques use base 2 (radix 2). Since 4-bit has a limited range, one or more embodiments change from radix 2 to radix 4.

In the aforementioned exemplary FP4 format, one bit is assigned to the sign of the number, three bits are assigned to radix 4 exponents, and no bits are used for the mantissa. The three bits assigned to the radix 4 exponents correspond to eight levels, namely: $[0, 2^{-6}, 2^{-4}, 2^{-2}, 2^0, 2^2, 2^4, 2^6]$. Note the even-numbered exponents. Adjacent values (other than zero) differ from each other by a factor of 4 (i.e. $2^2$). Unlike conventional FP formats, one or more embodiments of FP4 have no mantissa bit, which makes the approach similar to LNS (logarithmic number system) numbers, but with logarithms of base 4 and including a level equal to absolute zero. In some embodiments the symbol "0000" represents absolute zero. In some embodiments, the symbol "1000" also represents absolute zero. In other embodiments the symbol "1000" represents "Not a Number", also know an "NaN" to persons skilled in the art. FIG. 1 shows gradients of activations in one layer of a pertinent data set, which are quantized into the levels of FP4 the (zero level is not shown). FIG. 1 shows the original FP32 at 101 and, after quantization, FP4 (bars 103). No bars are shown for zero.

Figure 2:
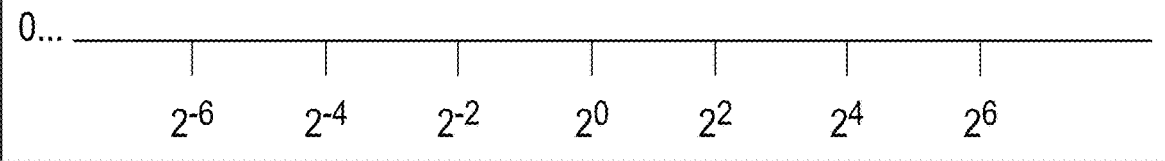
FIG. 2 shows eight levels of an exemplary four-bit floating point format with a radix-4 exponent and no mantissa bit, according to an aspect of the invention.
Figure 6:
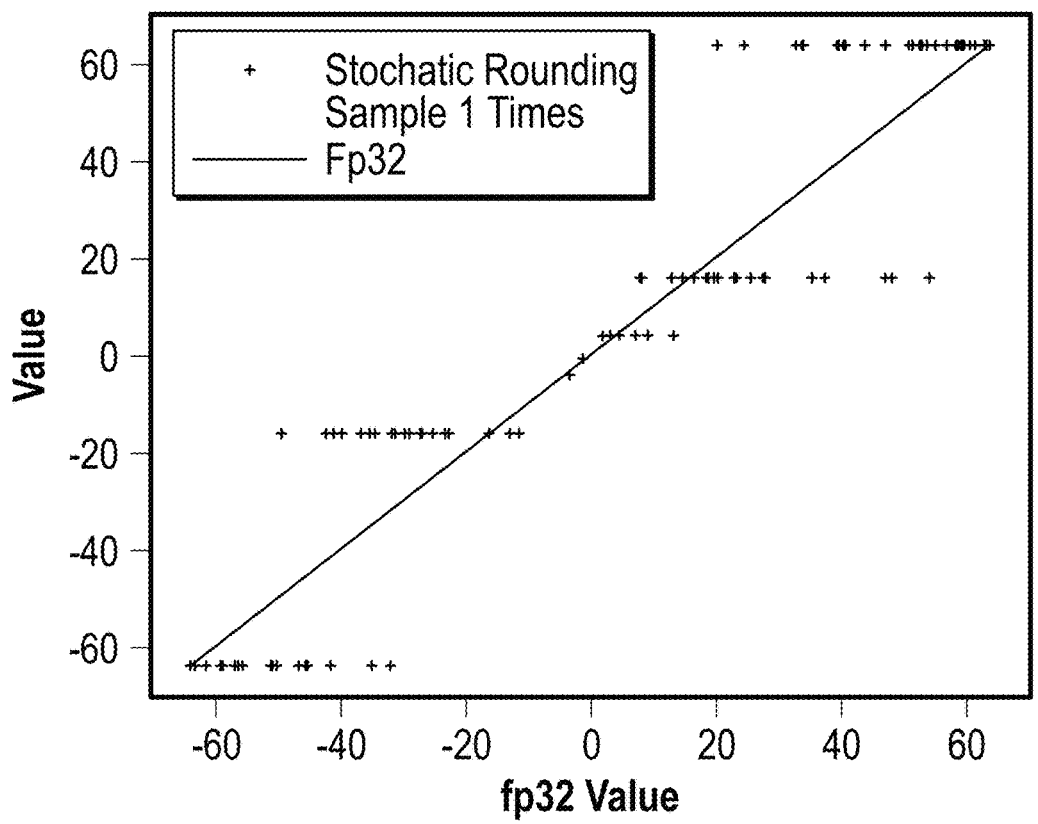
FIG. 6, FIG. 7, FIG. 8, and FIG. 9 show exemplary results for stochastic rounding for, respectively, one, ten, one hundred, and one thousand times.
Figure 7:
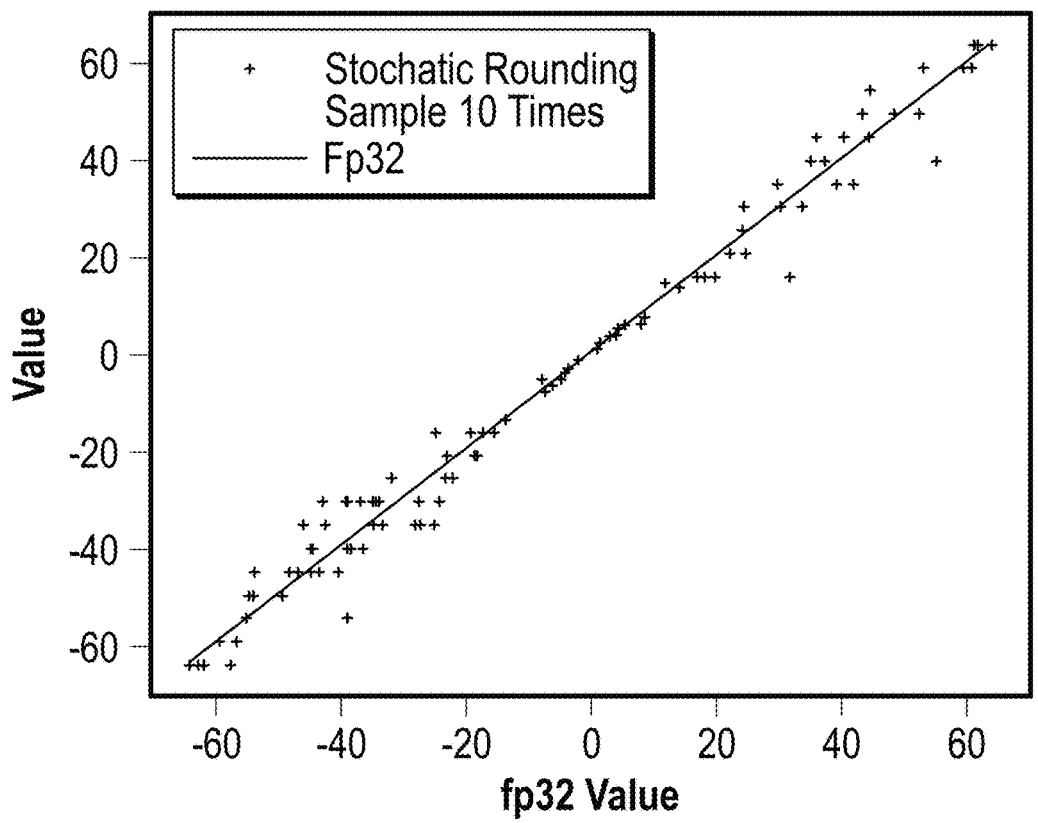
Figure 8:
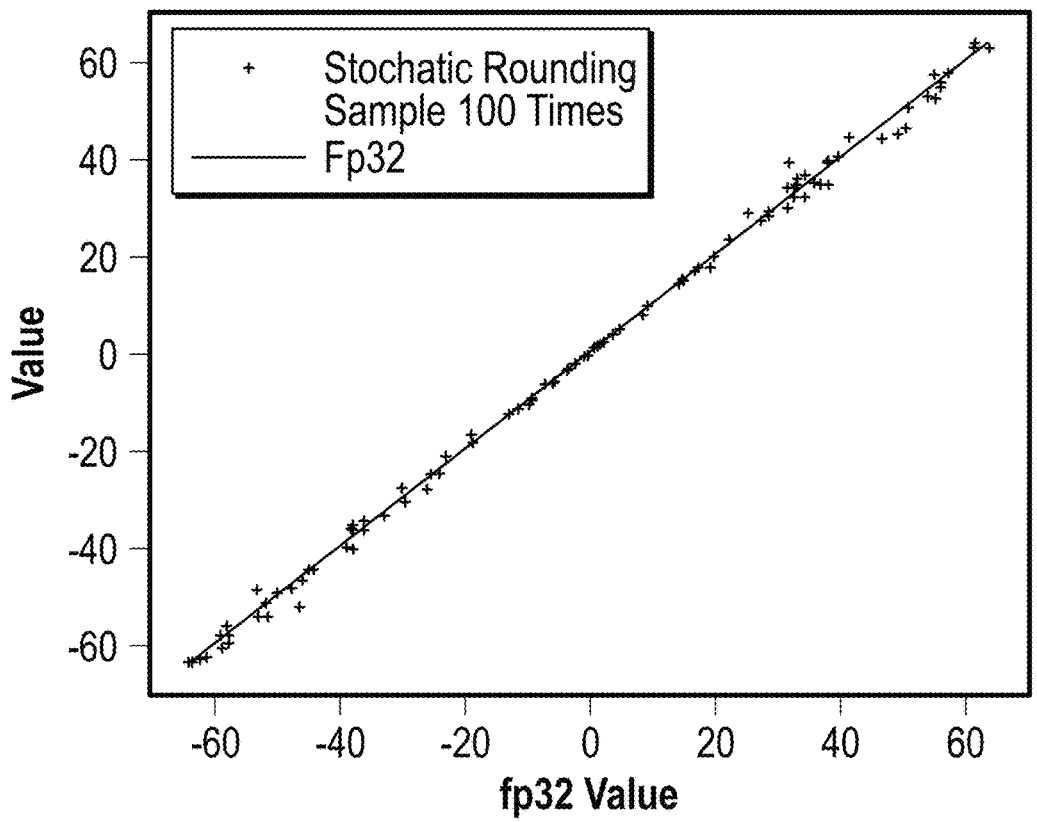
Figure 9:
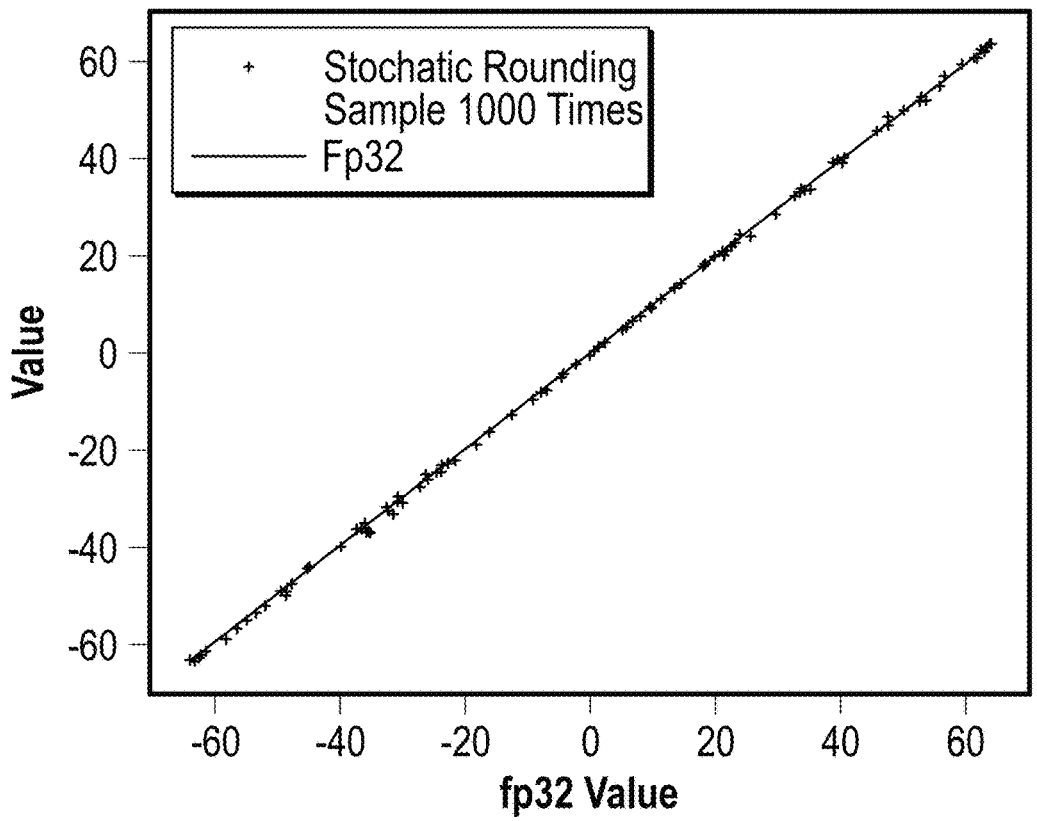

FIG. 2 shows eight levels of FP4 format with radix 4 exponents and no mantissa bit.

FIG. 3 shows a rounding (quantization) technique to go from a higher precision floating point (e.g., FP32, FP16, FP8, etc., referred to as $FP_{high}$ herein) number to an embodiment of the inventive FP4(1-3-0, radix 4) representation. Optionally, as shown in FIG. 3, to minimize the accumulated quantization error, $FP_{high}$ numbers can be multiplied by a shift bias 105. This bias will assure that given a certain distribution, the sum of all quantized FP4 numbers matches that of $FP_{high}$. For example, the bias for a sampled gradient distribution can be 1.6, the optimal point based on the mathematical deduction that can minimize the mean square error (MSE) when numbers are rounded into the FP4 representation. Given the teachings herein, the skilled artisan can select an appropriate bias for a given application using MSE minimization or other techniques. Thus, FIG. 3 illustrates a technique to quantize high precision numbers into FP4.

Quantization introduces error, but one or more embodiments advantageously minimize such error so that the training will not lose accuracy. To minimize quantization error, one or more embodiments multiply a high precision number by an arbitrary bias; this bias can be empirical or guided by numeric theory. For example, as noted, select 1.6 to minimize the MSE (mean square error). In an example, multiply the number by 1.6 and then round down to the nearest level. The arrows 107 show rounding without shifting bias. So, between $2^{-4}$ and $2^{-2}$, there is a single arrow 107 without the bias, meaning that without bias, all values from $2^{-4}$ up to just below $2^{-2}$ round down to $2^{-4}$. Similarly, between $2^{-2}$ and $2^0$, there is a single arrow 107 without the bias, meaning that without bias, all values from $2^{-2}$ up to just below $2^0$ round down to $2^{-2}$. With bias, values to the left of 109 round down to $2^{-4}$ and values to the right of 109 round up to $2^{-2}$, as indicated by the bold arrows emanating from 109. Similarly, with bias, values to the left of 111 round down to $2^{-2}$ and values to the right of 111 round up to $2^0$, as indicated by the bold arrows emanating from 111.

The preceding description is for in-range numbers. For out-of-range numbers, all numbers greater than $2^6$ round down to $2^6$. All numbers less than $2^{-6}$ round down to zero. Note that this processing of out-of-range numbers could be performed either before or after the rounding process (this also applies to the other variations of rounding disclosed herein). In one or more embodiments, the sign bit remains unchanged going from high precision to low precision. Thus, "numbers less than $2^{-6}$" refers to the absolute value of the number. Furthermore in this regard, one or more embodiments ignore the sign bit during the rounding phase and re-annex the sign bit to the number after rounding is completed.

In a clipping approach, all numbers larger than $2^6$ will be rounded down to $2^6$, while all numbers less than $2^{-6}$ will be rounded down to 0. With regard to rounding off the exponent, one or more embodiments round down to the nearest available level. With the multiplied bias, actual rounding is shown in FIG. 3. This is because the original numbers in the two nearest available levels $[2^a, 2^{a+2}]$ are moved towards the right in FIG. 3 after multiplying by the bias. Some numbers will move beyond $2^{a+2}$ in FIG. 3. Rounding down will then result in those original numbers rounded to $2^{a+2}$ and the rest rounded to $2^a$, as shown by the bold arrows emanating from points 109 and 111. One or more embodiments round first and then clip, but it is also possible to clip first and then round.

Refer now to FIGS. 4 and 5. Consider a stochastic quantization method to convert from FP32 to FP4(1-3-0, radix4). In a clipping approach, as discussed just above, all numbers larger than $2^6$ are rounded down to $2^6$, while all numbers less than $2^{-6}$ are rounded down to 0. In another aspect, stochastically round off the radix 2 exponent to radix 4. FIGS. 4 and 5 thus depict another way to reduce error. Instead of clipping, use stochastic rounding. Consider a high-precision number $x_{FP32}$. First, use a $\log_2$ function to obtain its exponent, $e_{FP32}$, which will fall into the range $[a, a+2]$. Here, "a" represents all the available exponents discussed above, i.e., $\{-6, -4, -2, 0, 2, 4\}$. Generate a random number $e_{rand}$ between zero and 1. A function F(x) is defined and plotted in FIG. 5. If F ($e_{FP32}$-a) is greater than $e_{rand}$, then set $X_{FP4}$ equal to $2^{a+2}$ (round up); else equal to $2^a$ (round down). Note that $x_{FRP4}$ is the value of $X_{FP32}$ converted to FP4(1-3-0, radix4). Choosing $$F(x) = \frac{(2x-1)}{3}$$

as is plotted in FIG. 5 makes the expectation IE of $X_{FP4}$ equivalent to the original $X_{FP32}$. Note that $X_{FP32}$ is a non-limiting example and a similar approach can be taken with other high-precision starting points (this is generally true through this disclosure). Note that FIG. 4 shows clipping prior to rounding; however, the clipping and rounding order are interchangeable in one or more embodiments. For example, in the case of rounding first, some high 2e-7 (i.e. $2 \times 10^{-7}$) numbers can be retained, and they will be rounded to 2e-6, instead of being clipped to 0.

Refer to the plots in FIGS. 6, 7, 8, and 9. In each graph, the X-axis is the FP32 value and the Y-axis is the corresponding FP4 value. Furthermore, in each graph, there is a straight line of slope one through the origin representing a perfect match. In each graph, the cross marks are the FP4 values. It can be seen that the crosses converge closer to the ideal value (straight line where FP4 exactly matches FP32) when moving from FIG. 6 (stochastically rounding the sample once) to FIG. 7 (stochastically rounding the sample ten times) to FIG. 8 (stochastically rounding the sample 100 times) to FIG. 9 (stochastically rounding the sample 1000 times).

Figure 10:
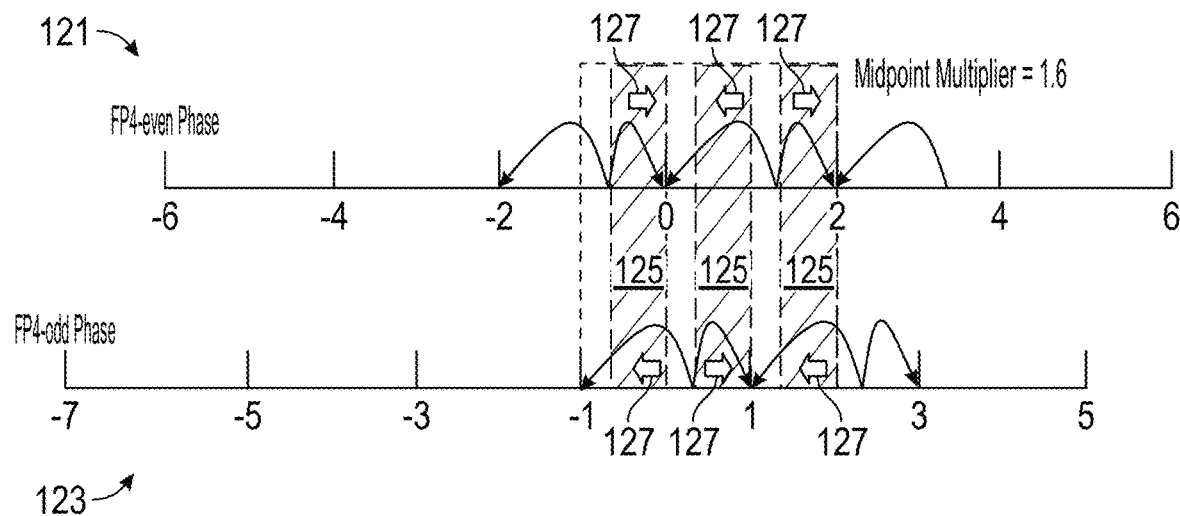
FIG. 10 shows an exemplary two-phase rounding method, according to an aspect of the invention.

Referring to FIG. 10, still another way to reduce error is two-phase rounding in a 4-bit approach. FP4-even 121 is as previously introduced. FP4-odd 123 has 2 raised to powers of odd numbers. Thus, to enhance the representation of FP4, the numbers can be rounded to one of the two phases in which: the FP4-even phase has all values in $2^{even\ numbers}$ while the FP4-odd phase has all values in $2^{odd\ numbers}$. In this aspect, shift the exponents by one: −6 is shifted to −7, 6 is shifted to 5, etc. It is also possible to shift up instead; i.e., −6 is shifted to −5, 6 is shifted to 7, etc. In FIG. 10, the numbers in the three regions 125 outlined by dashed rectangles (regions with error cancellation) are rounded towards opposite directions in the FP4-even and FP-odd phases respectively, as indicated by the arrows 127 (each of which points either left or right). In these regions, the expected error in FP4-even will cancel the one in FP-odd, since they have opposite signs, resulting in smaller expected rounding errors averaged over the two phases here.

In one or more embodiments, during rounding, each phase has different thresholds for rounding up/down, thus obtaining higher resolution by rounding the same number with two different thresholds. Once rounded, the same 4-bit numbers will be interpreted by hardware into different values depending on their phases; e.g., 0010 in FP4(1-3-0) will be $2^{-4}$ in the even phase, but $2^{-5}$ in the odd phase. If there are two uses of the same number, it is possible for one use to round up with the even phase and for another use to round down with the odd phase. This retains more information related to the number. Once the numbers are rounded, they are represented by 4 bits; e.g., 0010, and it is up to the hardware how to interpret the bits. In one or more embodiments, similar hardware can be employed for both phases. In deep neural network (DNN) training, the gradients rounded by one phase are normally used for back propagating the activation gradients, and the same gradients rounded by the other phase are used for calculating the weight gradients to update the model.

Figure 11:
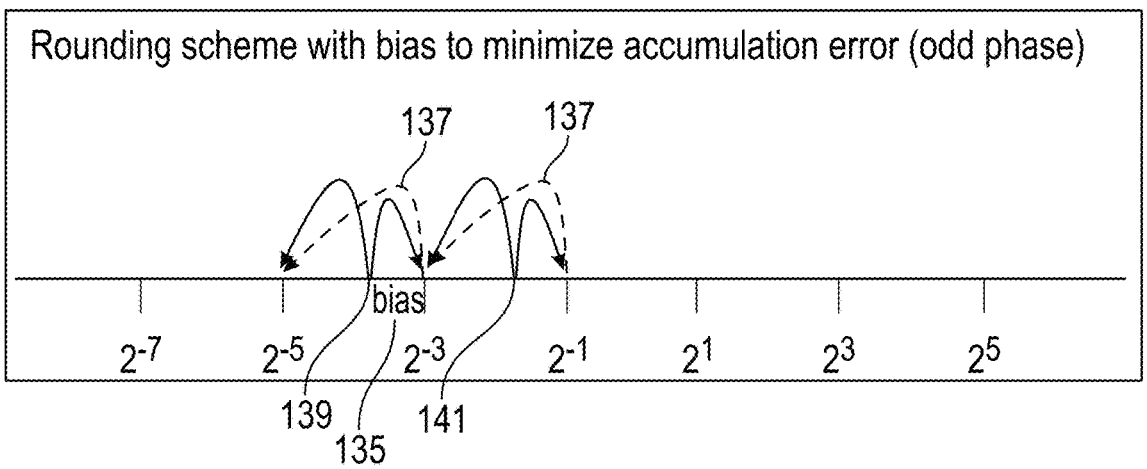
FIG. 11 shows an exemplary "odd" quantization method from FP32 to FP4(1-3-0, radix4), according to an aspect of the invention.

Referring to FIG. 11, consider an odd phase quantization method from FP32 to FP4(1-3-0, radix 4). Optionally, to minimize the accumulated quantization error, FP32 numbers are multiplied by a shift bias 135. This bias ensures that given a certain distribution, the sum of all quantized FP4 numbers matches that of FP32. For example, the bias for a sampled gradient distribution can be 1.6. In a clipping approach, all numbers larger than $2^5$ are rounded down to $2^5$, while all numbers less than $2^{-7}$ will be rounded down to 0. In a rounding off the exponent approach, round down to the nearest available (odd) level.

With the multiplied bias, the actual rounding is shown in FIG. 11. The arrows 137 show rounding without shifting bias. So, between $2^{-5}$ and $2^{-3}$, there is a single arrow 137 without the bias, meaning that without bias, all values from $2^{-5}$ up to just below $2^{-3}$ round down to $2^{-5}$. Similarly, between $2^{-1}$ and $2^{-3}$, there is a single arrow 137 without the bias, meaning that without bias, all values from $2^{-3}$ up to just below $2^{-1}$ round down to $2^{-3}$. With bias, as per the bold arrows, values to the left of 139 round down to $2^{-5}$ and values to the right of 139 round up to $2^{-3}$. Similarly, values to the left of 141 round down to $2^{-3}$ and values to the right of 141 round up to $2^{-1}$. The preceding description is for in-range numbers. For out-of-range numbers, all numbers greater than $2^5$ round down to $2^5$. All numbers less than $2^{-7}$ round down to zero. In one or more embodiments, the sign bit remains unchanged going from high precision to low precision. Thus, "numbers less than $2^{-7}$" refers to the absolute value of the number. Refer to the discussion of handling the sign bit elsewhere herein. It is worth comparing FIG. 11 to FIG. 3; all that changes in the illustrated embodiments is the exponent from even to odd; the rest is the same.

Figure 12:
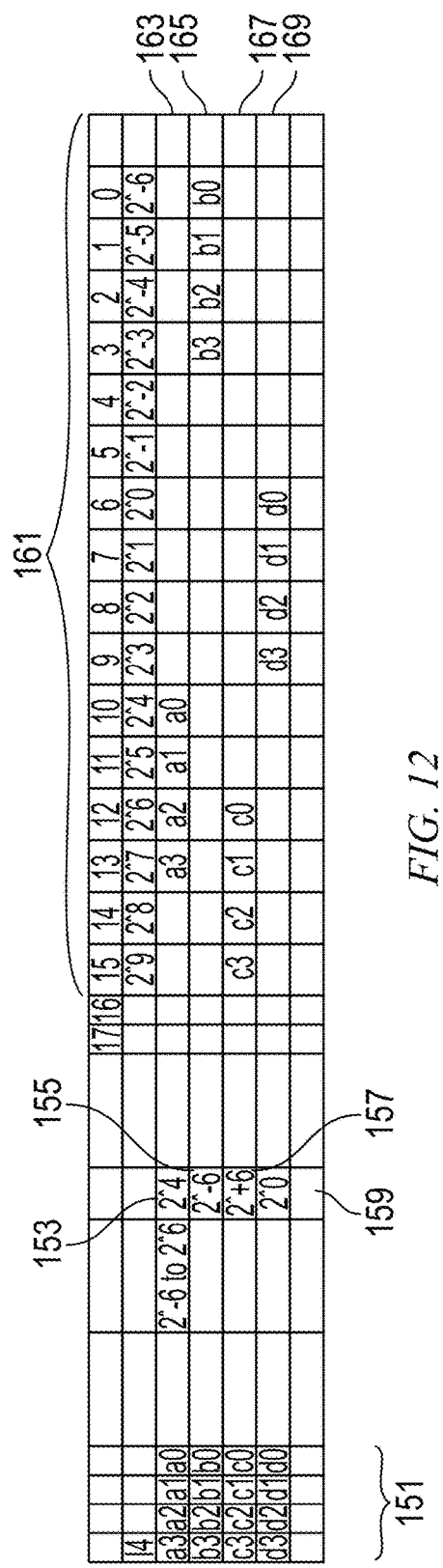
FIG. 12 shows, in tabular form, aspects of an exemplary hardware implementation of a multiply-add function using an FP4(1-3-0, radix4) format, according to an aspect of the invention.

Refer now to FIG. 12 and consider an exemplary hardware implementation of the sum of (FP4×INT4). The INT4 number is a signed two's complement number, having a range [−8,7]. The FP4 number has seven possible values (excluding the sign bit and NaN; in computing, NaN, standing for Not a Number, is a member of a numeric data type that can be interpreted as a value that is undefined or unrepresentable, especially in floating-point arithmetic). Since each of the seven possible values of the FP4 number is a power of 2 [$2^{-6}$, $2^6$] and an absolute 0, the product of an INT4 and an FP4 is computed by shifting the INT4 number left or right depending on the FP4 number. If the hardware is configured to perform an N-way INT4×FP4 fused-multiply add, these N shifted numbers can all be added together to obtain the final result. FIG. 12 shows an exemplary 4-way INT4×FP4 fused multiply-add. The 16-bit numbers are added and then normalized/rounded if the result is a floating point (FP) number, or only rounded if the result is an integer (INT) number. Thus, in one or more embodiments, when a hardware implementation executes an instruction, this produces a sum of products.

Thus, as discussed, one of the multiplicands is an FP4 value. The other is an INT4 (fixed point number). To generate the product, because the four values are just a power of two in hardware, multiplication becomes a shift operation. Refer to the example of FIG. 12. There are four 14 numbers a, b, c, and d, each having 4 bits numbered from zero (least significant) to three (most significant). That is, a has four bits a3, a2, a1, a0, and similarly for b, c, and d, as seen at 151. Multiply a by $2^4$ as seen at 153, b by $2^{-6}$ as seen at 155, c by $2^6$ as seen at 157, and d by $2^0$ as seen at 159. Note that the "^" symbol in FIG. 12 refers to exponentiation. Depending on the value of the exponent, place the a3 a2 a1 a0 (and so on for b, c, d) in particular locations in a 16-bit word (the 16 bits in FIG. 12 are numbered 0 through 15) as seen at 161 (the bits numbered 16 and 17 are for overflow when the numbers are added). Place the 0 bit at the location corresponding to the FP4 number. For a, the zero bit a0 goes to the $2^4$ location (corresponding to 153) and the other bits a1, a2, a3 are placed at $2^5$, $2^6$, and $2^7$, respectively. A similar process is also carried out for b, c, and d. For b, the zero bit b0 goes to the $2^{-6}$ location (corresponding to 155) and the other bits b1, b2, b3 are placed at $2^{-5}$, $2^{-4}$, and $2^{-3}$, respectively. For c, the zero bit c0 goes to the $2^6$ location (corresponding to 157) and the other bits c1, c2, c3 are placed at $2^7$, $2^8$, and $2^9$, respectively. For d, the zero bit d0 goes to the $2^0$ location (corresponding to 159) and the other bits d1, d2, d3 are placed at $2^1$, $2^2$, and $2^3$, respectively. The other positions in the table are just filled in with zeroes (omitted in FIG. 12 to avoid clutter). Then, add the four 16-bit numbers 163, 165, 167, and 169. The result can be a number having up to 18 bits (numbered zero to 17). Thus, the 16-bit numbers are added and then normalized/rounded if the result is an FP number or only rounded if the result is an INT number.

Figure 13:
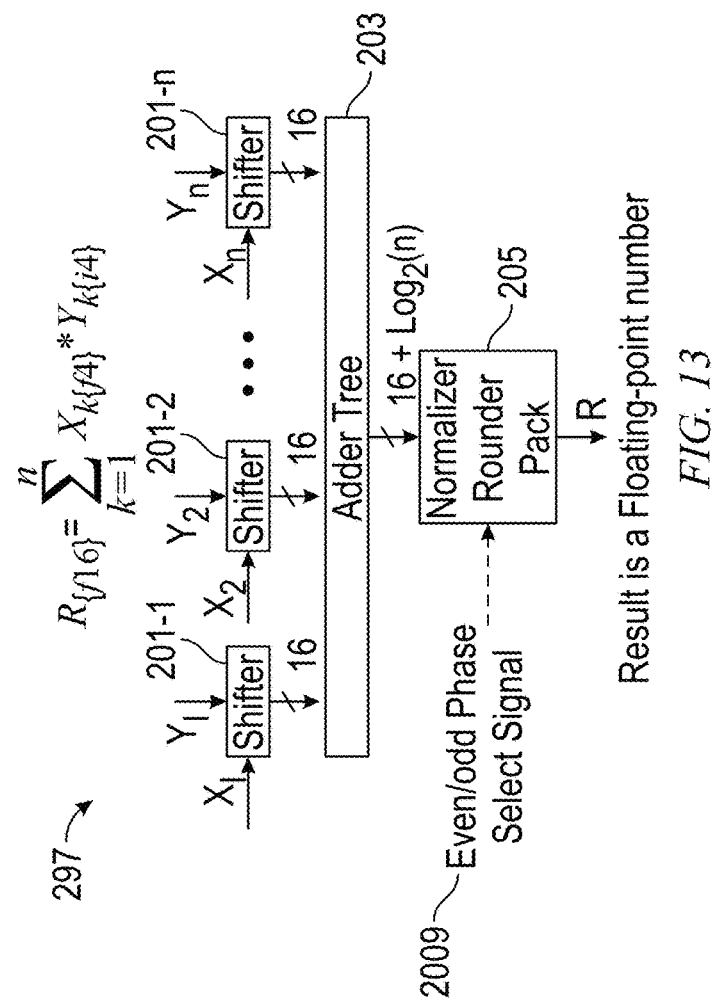
FIG. 13 is a hardware block diagram of processing element with a floating-point output, according to an aspect of the invention.
Figures 14, 15:
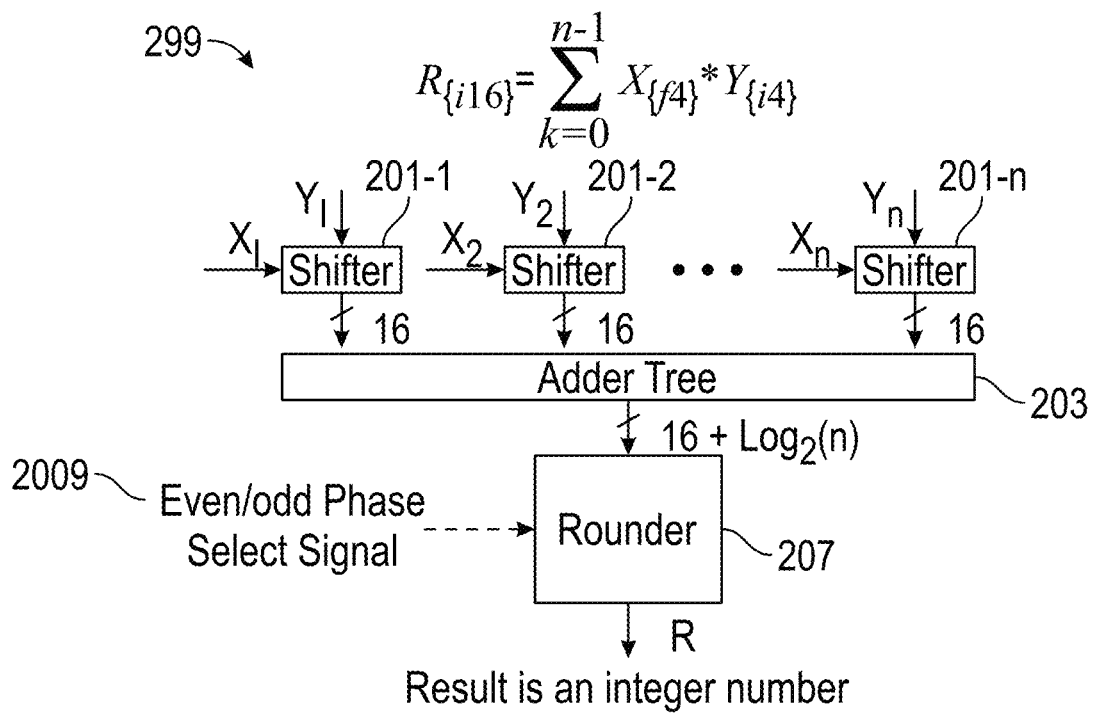
FIG. 14 is a hardware block diagram of processing element with an integer output, according to an aspect of the invention.
FIG. 15 shows aspects of even/odd phase handling, according to an aspect of the invention.

FIG. 13 is a hardware block diagram for the case where the result is a floating-point number, while FIG. 14 is a hardware block diagram for the case where the result is an integer number. One or more embodiments are implemented with shifters 201-1, 201-2, 201-n. The circuit of FIG. 13 sums X and Y. X (bits $X_1, X_2, \ldots, X_n$) is the floating point and Y (bits $Y_1, Y_2, \ldots, Y_n$) is the integer (in the integer case, the number is just the regular 2's complement). The product is implemented with N shifters (N shifters for N-way multiply-add). The bits of the integer $Y_1, Y_2, \ldots, Y_n$ come into the shifter while $X_1, X_2, \ldots, X_n$ control the amount of shift. The result (in the illustrated non-limiting example) is a 16-bit number. These 16-bit numbers are added up together in the adder tree 203. The final result has $16+\log_2(N)$ bits (in the illustrated non-limiting example). In FIG. 13 (floating point result), the output of the adder tree 203 goes through the normalizer, rounder and pack logic 205 and produces a floating-point number R (FP16 in the illustrated non-limiting example). Optional even/odd phase select signal 2009 can be provided when using even and odd phases as discussed elsewhere herein; refer to discussion of FIG. 20.

FIG. 14 is similar except that the target format is an integer format (i.e. the result is an integer number), INT16 (in the illustrated non-limiting example), and a rounder 207 is used to round down to 16 bits. Optional even/odd phase select signal 2009 can be provided when using even and odd phases as discussed elsewhere herein; refer to discussion of FIG. 20. Shifters 201-1, 201-2, 201-n can be implemented using known digital logic circuits, as would be apparent to the skilled artisan, given the teachings herein. More specifically, by way of a non-limiting example, given block diagrams such as FIGS. 13, 14, 18, 19, and 20, the skilled artisan can represent same in a suitable hardware description language (HDL) and synthesize the HDL representation into a Netlist, which can then be fabricated as an integrated circuit (IC) using known IC fabrication techniques, in any desired logic family—see, e.g., discussion "EXEMPLARY DESIGN PROCESS USED IN SEMICONDUCTOR DESIGN, MANUFACTURE, AND/OR TEST" below. Similarly, standard floating-point units (FPUs or math coprocessors) typically have adder trees, a normalizer, a rounder, and pack logic; given the teachings herein, the skilled artisan will be able to implement elements 203, 205, 207 by adapting known circuitry. One novel aspect of one or more embodiments is the use of shifters rather than multipliers to perform multiplication. Another point of novelty in one or more embodiments is that it is not necessary to further shift and align the terms with respect to each other.

Thus, in one or more embodiments, standard digital circuit design techniques are used to implement the individual building blocks (shifter, adder tree, etc.). In one or more embodiments, these elements are arranged in a novel manner: the binary shifters 201-1, 201-2, 201-n play a dual role—they perform multiplication as well as alignment of the terms to be added up. In contrast, standard implementations of multiply-accumulate hardware require multipliers as well as shifters for each of the terms. One or more embodiments advantageously omit such multipliers. This is enabled in one or more embodiments by the choice of FP4(1-3-0) format (where 0 bits are assigned for the mantissa).

Figure 20:
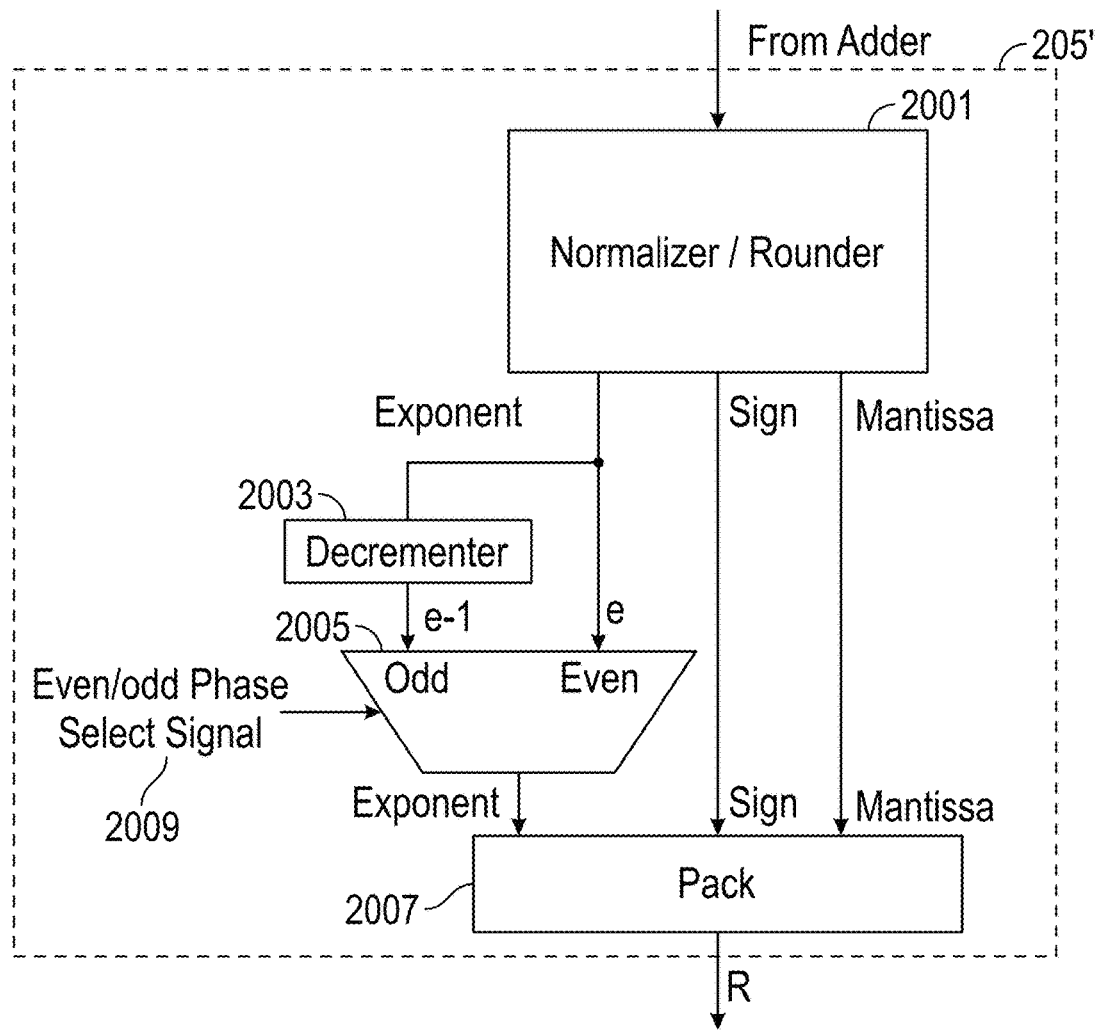
FIG. 20 shows a modified normalizer/rounder/pack circuit suitable for use with even/odd phase techniques, according to an aspect of the invention.

Referring now to FIG. 15, consider even and odd phase handling. The value of $X_k$ for the odd phase is half that for the even phase, and thus the value of R for the odd phase is half that for the even phase. With R being a floating-point number, this means that the exponent term in the final result is selectively reduced in value by 1 in odd-phase computation. In one or more embodiments, a minor change to the normalizer is made to support this additional mode. The normalizer produces a final exponent value; the final pack-logic ensures that such value is within an acceptable range. If not, saturate to 0/infinity. Since the exponent value is reduced by one in odd-phase computation, the risk is run of the number becoming smaller than the smallest representable number in the result. In such a case, in one or more embodiments, the result will be saturated to 0 (not infinity—that is not possible in such an embodiment). Thus, for odd-phase computation, the normalizer result is either "regular result" or "regular result –1" in the even_phase and odd_phase computations, respectively. Refer to FIG. 20.

Thus, in one or more embodiments, $X_k$ is represented using 4 bits. For the same 4 bits, when they are in the odd phase, the value is just ½ of the value in the even phase. Similarly, the result R for odd is half of the result for even.

The skilled artisan will appreciate that, given the teachings herein, many variations are possible. For example, N can be chosen to fit existing datapath widths. In this regard, N=4 results in a compute unit that has 16-bit inputs. In another aspect, N can be chosen to execute massively parallel multiply-accumulate. R may be, for example, FP16, INT16, or FP32, depending on the algorithm/microarchitecture needs. FP32 does not need a rounder for up to 256-way addition. INT16 does not need a normalizer. Other formats for R are also possible (for example, INT8, FP8, and the like).

Figure 16:
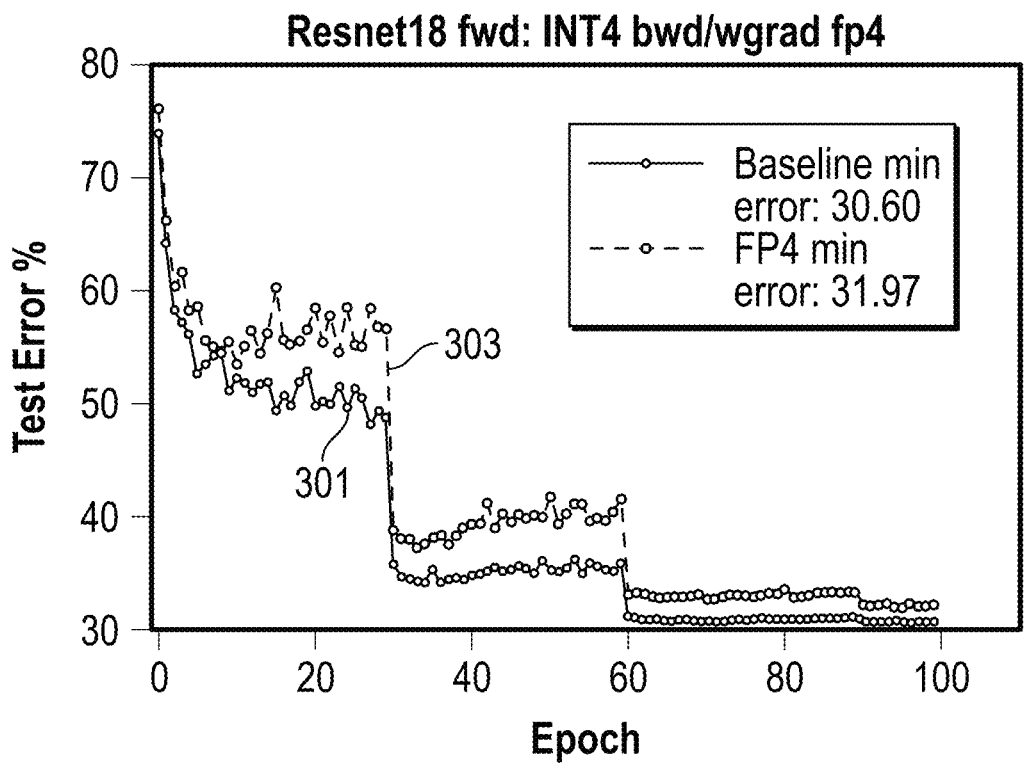
FIG. 16 and FIG. 17 show non-limiting exemplary experimental results achieved with exemplary embodiment(s) of the invention.
Figure 17:
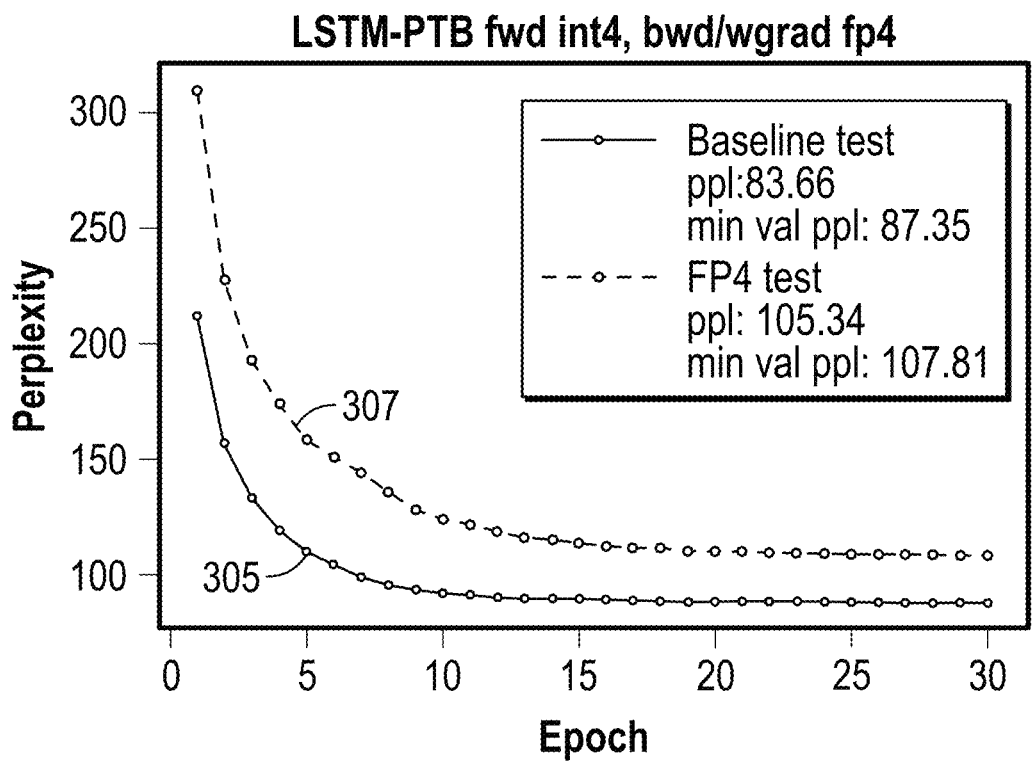

Examples: FIG. 16 shows that on one dataset, well-designed 4-bit training 303 achieves only ~1.3% accuracy loss compared to a baseline 301, while FIG. 17 shows that on another dataset, results are also promising (compare baseline 305 to FP4 307). Thus, one or more embodiments yield good results on deep learning tasks.

Figure 18:
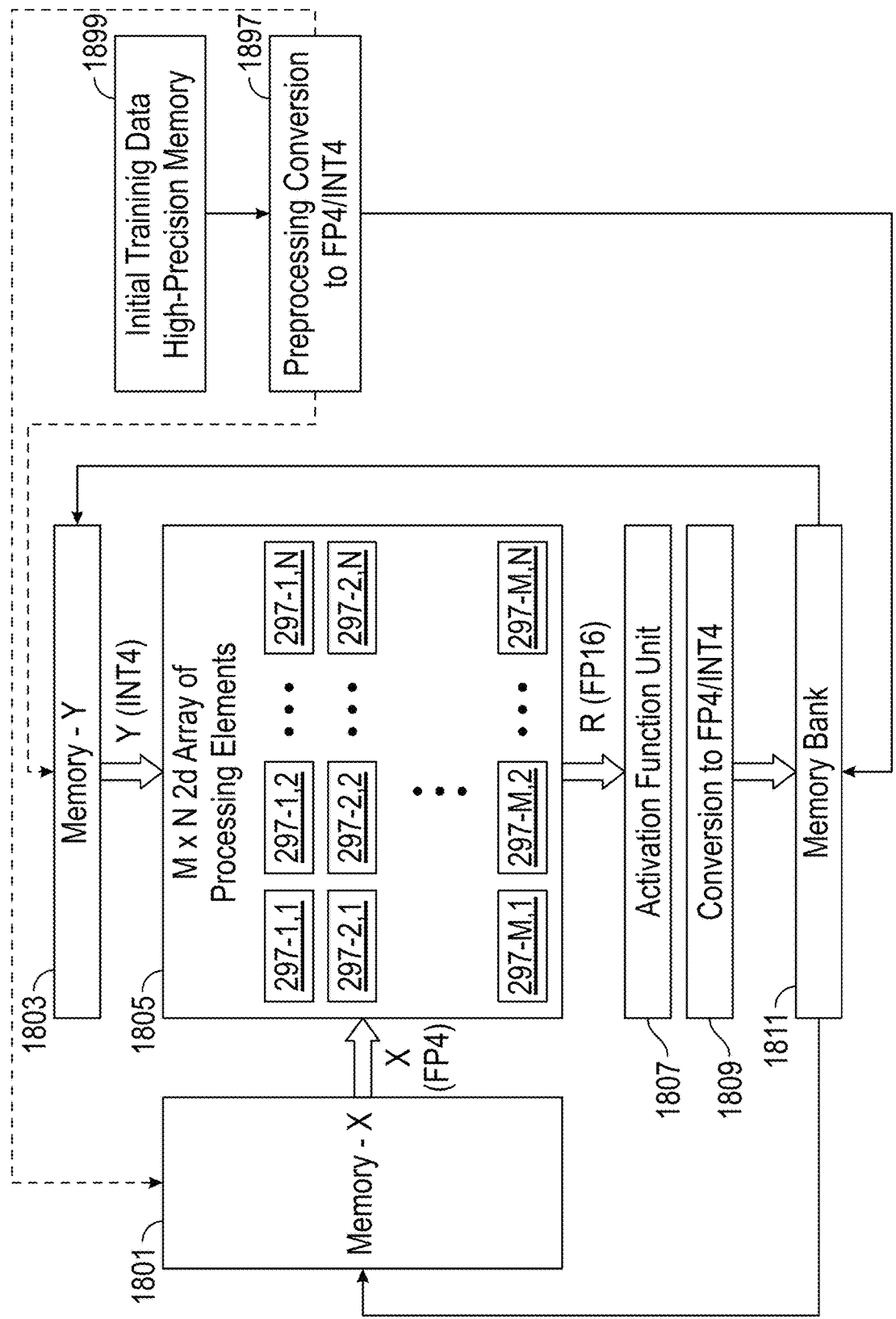
FIG. 18 shows a system including an array of processing elements in a larger context, according to an aspect of the invention.

FIG. 18 shows a system including an array 1805 of processing elements (297-1,1 through 297-M,N corresponding to element 297 in FIG. 13 but also representative of elements of type 299 shown in FIG. 14) in a larger context. The array is fed by memory bank 1811 which supplies X values to memory 1801 and Y values to memory 1803. The output R of the array is supplied to the activation function unit (AFU) 1807, in turn to the conversion unit 1809, and the memory bank 1811. Initial training data in a high-precision format can be held in a memory 1899 and pre-processed into FP4 and INT4 portions with preprocessing conversion block 1897.

Figure 19:
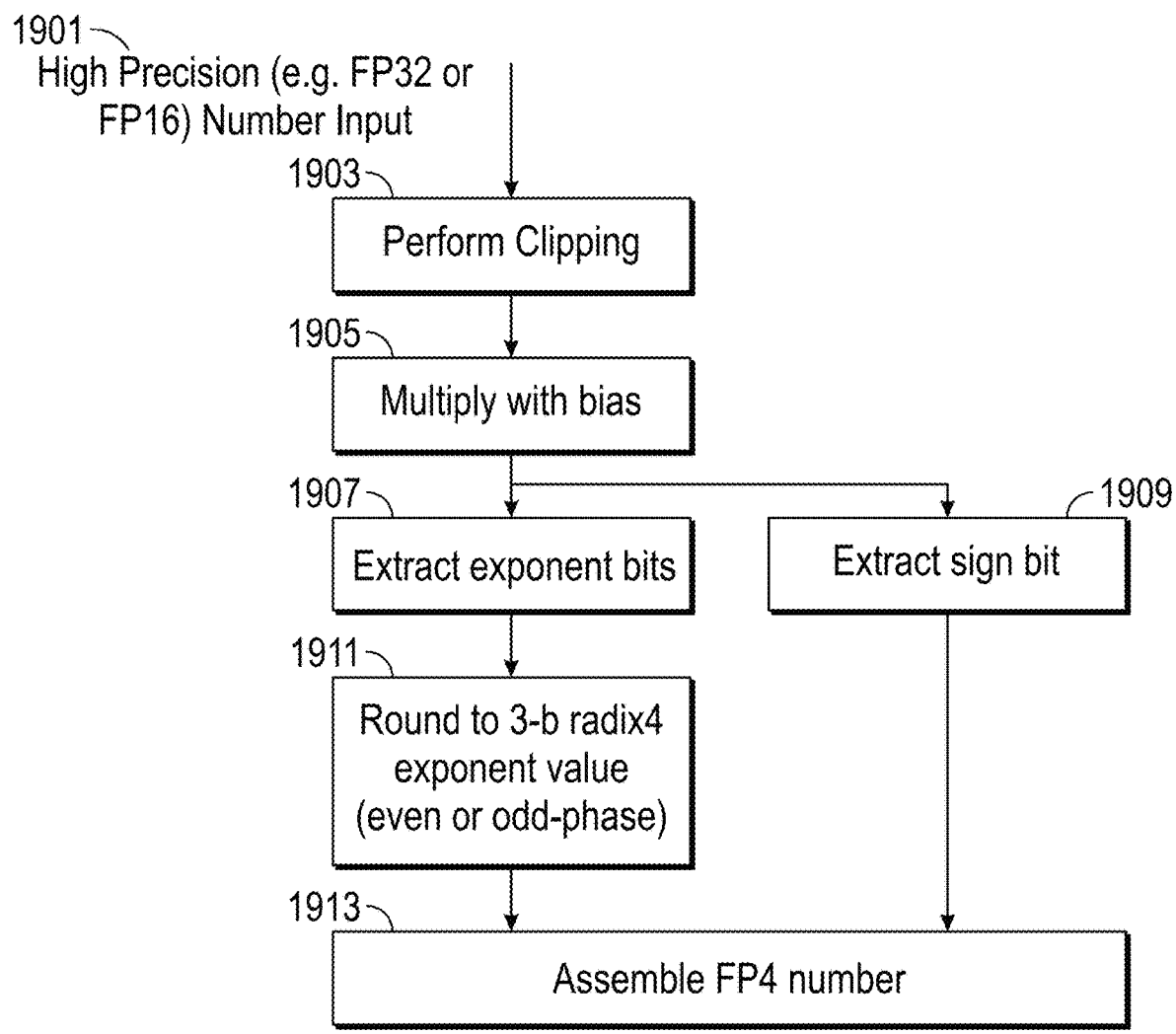
FIG. 19 is a combined block diagram and flow chart of a conversion unit, according to an aspect of the invention.

FIG. 19 shows exemplary details of a hardware implementation that converts high precision input (FP16 and FP32 are non-limiting examples) to FP4; it is generally representative of the conversion units 1809, 1897 of FIG. 18. A high-precision number is input (e.g., FP32, FP16) at 1901. Block 1903 performs clipping. Block 1905 performs multiplication with bias (e.g. 1.6 or other suitable value as discussed herein). The exponent bits and sign bit are then extracted at blocks 1907, 1909 respectively. In block 1911, the exponent bits are rounded to a three-bit radix4 exponent value (even or odd-phase); the previously-extracted sign bit is then annexed to the rounded result to assemble the FP4 number in block 1913. FIG. 19 can be implemented in hardware by the skilled artisan given the teachings herein.

FIG. 20 shows an exemplary modified version 205' of the normalizer rounder pack block 205 of FIG. 13, suitable for implementing in hardware the even-odd approach discussed herein. The output of adder tree 203 is fed to normalizer/rounder 2001 which supplies the sign and mantissa bits directly to pack circuit block 2007. On the other hand, the exponent bit(s) representing exponent value e are sent to decrementer 2003 which subtracts one therefrom yielding e-1. Both e and e-1 are input to multiplexer 2005, and the selection of the appropriate input is controlled by even/odd phase select signal 2009. When signal 2009 indicates the even phase, multiplexer 2005 passes e to pack circuit block 2007; when signal 2009 indicates the odd phase, multiplexer 2005 passes e-1 to pack circuit block 2007. Referring to equation 2011, and FIG. 15, the exponent of the result is selectively reduced by one in odd-phase computation using a decrementer and a multiplexer. A suitable control block (not shown to avoid clutter) can be provided to assert the signal 2009 of appropriate value at appropriate times, and to control the other elements, using known techniques, given the teachings herein. For the integer case (rounder 207 of FIG. 14), the skilled artisan will appreciate that the divide-by-2 logic needed in the odd-phase can be implemented by simply applying a right shift.

Given the discussion thus far, and referring to FIGS. 13 and 14, it will be appreciated that an exemplary processing element 297, 299, according to an aspect of the invention, includes a plurality of binary shifters 201-1, 201-2, . . . , 201-n, each having an integer input $Y_1, Y_2, \ldots, Y_n$ including (e.g. configured to obtain from the memory 1803) corresponding bits of a 4-bit integer multiplicand, and a shift-specifying input $X_1, X_2, \ldots, X_n$ including (e.g. configured to obtain from the memory 1801) corresponding bits in an exponent field of a 4-bit floating point multiplier (the skilled artisan will appreciate from the context whether a "multiplier" as used herein is a number that multiplies a multiplicand, or a piece of hardware, and that integer numbers as typically represented in a computer do not have exponent fields). The multiplier is specified in a mantissaless four-bit floating point format including a sign bit, three exponent bits, and no mantissa bits. The processing element also has an output. The shifter outputs can be 16 bits as shown, or narrower, or wider. The 16-bit values are suitable for use with FP4 X inputs, for example.

The processing element also has an adder tree 203 having a plurality of inputs coupled to the outputs of the plurality of shifters, and an output. In the example where the shifter outputs are 16 bits, the output of the adder tree includes $16+\log_2(n)$ bits, where n is the number of shifters.

The processing element further has a rounder 205, 207 having an input coupled to the output of the adder tree and having an output R.

As is discussed elsewhere herein (e.g. with respect to FIG. 18), in one or more embodiments, Y ($Y_1, Y_2, \ldots, Y_n$) is obtained from neural network weights or activations registers 1803 and X ($X_1, X_2, \ldots, X_n$) is obtained from gradient registers 1801. R is provided to the memory bank 1811 (e.g. via activation function unit (AFU) 1807 and conversion unit 1809 as discussed elsewhere herein).

In one or more embodiments, the processing element is configured to perform multiplication of the multiplicand and the multiplier using only the plurality of binary shifters 201-1, 201-2, . . . , 201-n, and without use of digital multiplier circuits. That is to say, in one or more embodiments, the processing element multiplication using only digital shifter circuits, and not digital multiplier circuits. Of course, the processing elements could be part of a larger integrated circuit that includes digital multiplier circuits in other parts of the circuit for other purposes.

Referring to FIG. 14, in some instances, the rounder 207 is configured to output an integer number. On the other hand, referring to FIG. 13, in some instances, the rounder 205 further includes a normalizer and a pack circuit, and aid rounder is configured to output a floating-point number. The designer decides a priori whether an integer or floating-point output is desired, depending on what is needed for downstream processing.

In some cases, referring to FIG. 20, the rounder 205' includes a normalizer-rounder block 2001 having the input of the rounder ("from adder"), an exponent output, a sign output, and a mantissa output; a pack circuit 2007 having an exponent input, a sign input coupled to the sign output of the normalizer-rounder block, and a mantissa input coupled to the mantissa output of the normalizer-rounder block; and a multiplexer 2005. The multiplexer 2005 has an even input coupled to the exponent output of the normalizer-rounder block, an odd input, an output coupled to the exponent input of the pack circuit, and an even/odd phase select input 2009. The multiplexer is configured to select, for output to the pack circuit, the even input when the phase select input is a first value and the odd input when the phase select input is a first value. The rounder 205' further includes a decrementer 2003 coupled between the exponent output of the normalizer-rounder block and the odd input of the multiplexer. The decrementer is configured to decrement an input by one (i.e. transform input exponent e to e-1).

In one or more embodiments, the outputs of the binary shifters include 16-bit outputs, and the output of the adder tree includes a sixteen+$\log_2(n)$ bit output, where n is the number of binary shifters.

In another aspect, referring to FIG. 18, an exemplary apparatus includes a floating-point gradient register 1801, an integer register 1803; a memory bank 1811; and an array 1805 of processing units 297, 299 having M rows and N columns. To avoid clutter, the processing units are numbered as 297-1,1, 297-1,2, . . . , 297-1,N for the first row; 297-2,1, 297-2,2, . . . , 297-2,N for the second row, and 297-M,1, 297-M,2, 297-M,N for the last row, it being understood that each element is equally representative of a unit 299. Each of the processing units in turn includes a plurality of binary shifters, an adder tree; and a rounder as described elsewhere herein. The integer inputs of the processing units are connected to the integer register 1803. The shift-specifying inputs of the processing units are connected to the floating-point gradient register 1801. The outputs of the rounders are coupled to the memory bank 1811.

In some instances, only one row is present (M=1). Each element 297, 299 can have logic to consume X from the left/west but also forward it to the right/east, as well as logic to consume Y coming from the top/north and also forward it to the bottom/south. Thus, in one or more embodiments, each element 297, 299 is obtaining X and Y in unaltered form from memories 1801, 1803 (directly or forwarded in an unaltered manner through the other processing units). The result R from each block is forwarded to AFU 1807; that is, in one or more embodiments, each element 297, 299 operates in parallel, obtains X and Y from 1801, 1803 and sends its R to 1807. Given the teachings herein, the skilled person can understand how to route wires in an IC to provide the interconnections described. Also, left/right, west/east, north/south, and up/down are exemplary directions and not intended to be limiting.

During some stages of calculation, the floating-point gradient register 1801 contains values for a neural network activation gradient matrix, and the integer register 1803 contains values for a neural network weight matrix. During some stages of calculation, the floating-point gradient register 1801 contains values for a neural network activation gradient matrix, and the integer register 1803 contains values for a neural network activation matrix. Furthermore in this regard, in one or more embodiments, the weight gradient is an output, not an input, and there are two multiplications in this aspect: (1) activation gradient matrix multiplies the activation (to obtain the weight gradient), and (2) the activation gradient matrix multiplies the weight matrix (to obtain the activation gradient matrix for the previous layer in backward propagation, and so on). Thus, for an exemplary embodiment of an INT4×FP4 multiply-accumulate (MAC) unit, INT4 could be weight or activation, and FP4 is always the activation gradient.

FIG. 19 is representative of both conversion unit 1809 and pre-processing conversion unit 1897 which converts the initial high-precision training data in memory 1899; the output R of array 1805 is high precision and is reduced to FP4/INT4 for subsequent handling by elements 297, 299. Processing elements 297, 299 typically perform matrix multiplication/convolution, while AFU 1807 performs non-linear functions on the result R; e.g., sigmoid, tan h, Rectified Linear Unit (ReLU), and the like. AFU 1807 takes as input high-precision output R (e.g. FP16, INT16, FP32, INT32) and produces a corresponding high precision output (e.g. FP16, INT16, FP32, INT32). AFU 1807 is implemented, for example, using standard computation blocks in central processing units (CPUs), graphics processing units (GPUs), and the like. Given the teachings herein, the skilled artisan familiar with neural networks and computer architecture can implement a suitable AFU with known components.

It will thus be appreciated that one or more embodiments further include a conversion unit 1809 intermediate the outputs of the rounders and the memory bank 1811. Unit 1811 stores numbers, and under program instructions, forwards same to memories 1801, 1803. Unit 1811 (and similarly unit 1899) can be, for example, an off-chip dynamic random-access memory (DRAM) or on-chip cache, on-chip RAM, or an on-chip flash, for example. Memories 1801, 1803 can be on-chip memory, for example. The skilled artisan will be familiar with computer architecture and can implement elements 1811, 1801, 1803, and 1899, given the teachings herein. It will thus be further appreciated that one or more embodiments still further include an activation function unit (AFU) intermediate said outputs of said rounders and said conversion unit 1809.

In still another aspect, an exemplary method for training a computer-implemented neural network, according to an aspect of the invention, includes accessing a first portion (e.g. in memory 1801) of training data for a neural network in a mantissaless four-bit floating point format including a sign bit, three exponent bits, and no mantissa bits (e.g. FP4 as described herein). The training data is initially in a higher-precision format (e.g. FP32, FP16, INT16, or the like) than the four-bit format. This first portion of training data represents, for example, a weight gradient or an activation gradient.

A further step includes accessing a second portion (e.g. in memory 1803) of the training data for the neural network in a four-bit integer format (e.g. INT4 2's complement).

Yet a further step includes training a computerized neural network on the first portion of the training data represented in the mantissaless four-bit format and the second portion of the training data represented in the four-bit integer format. The training includes multiplying four-bit integers in the second portion of the training data by numbers in the first portion of the training data represented in the mantissaless four-bit floating point format, and adding results of the multiplying. The multiplying and adding are carried out with digital shifter and adder circuitry and without use of digital multiplier circuits (see FIGS. 13 and 14).

Figure 21:
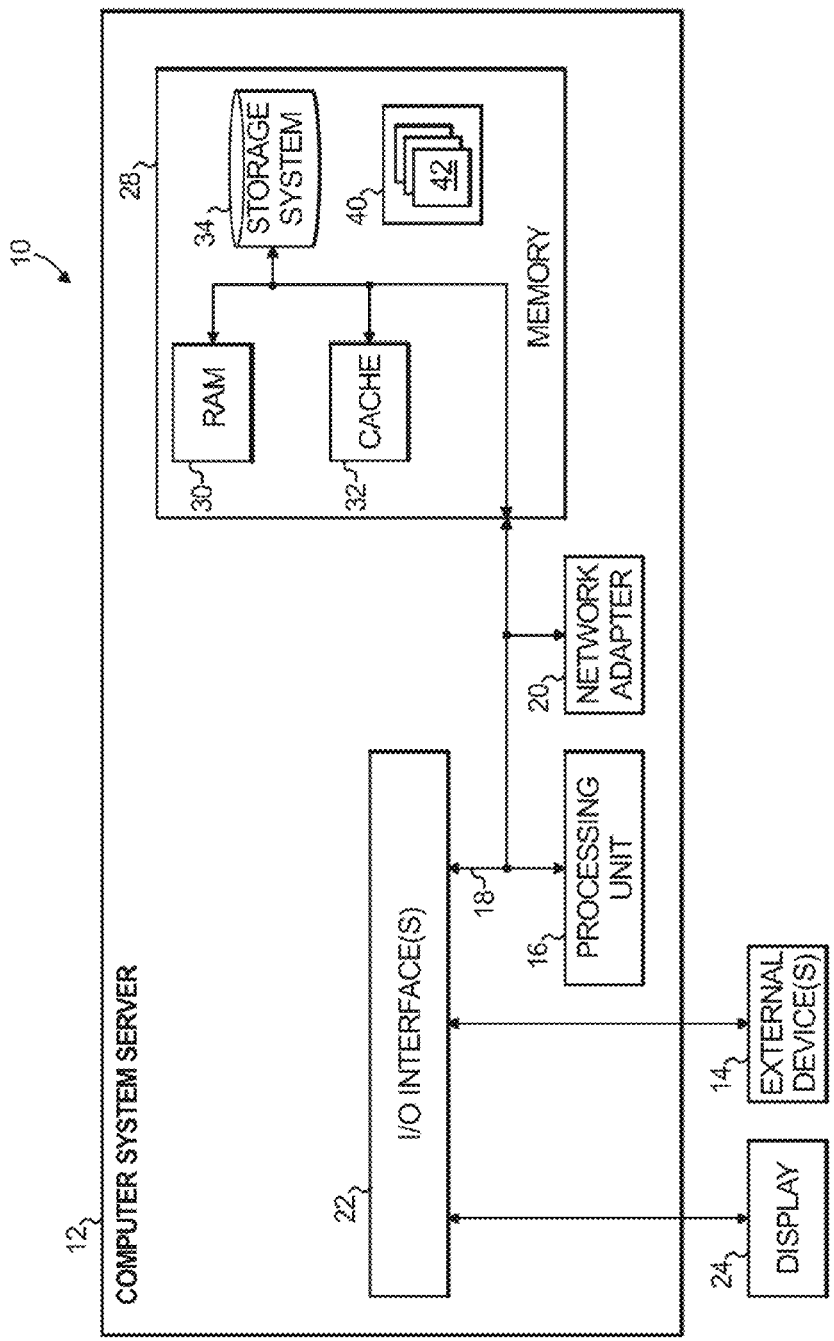
FIG. 21 depicts a block diagram of a representative of both a general purpose computer that can deploy a neural network trained in accordance with aspects of the invention and one with specialized circuitry in the processor, in accordance with aspects of the invention, for training neural networks.

An even further step includes deploying the computerized neural network, trained on the first and second portions of the training data (e.g. sending data to implement the trained neural network on a general-purpose (or special-purpose) computer as in FIG. 21). Indeed, once trained, the neural network can be implemented on a variety of types of hardware platforms, whether off the shelf or custom hardware specially designed for inferencing. FIG. 21 is representative of both a general purpose computer and one with specialized circuitry in the processor 16. The trained neural network can be deployed on a computer with special processing units as disclosed herein that does the training, on a general purpose computer with an ordinary processor that is different than the computer that does the training, or on a computer with specialized processor circuitry that is different than the computer that does the training.

It is worth noting that training a neural network typically requires performing large matrix multiplications or convolutions. One matrix could be a weight and another matrix could be an activation gradient, for example. In one or more embodiments, the multiply-accumulate engines are used in the multiplications. In neural network training according to the prior art, these matrix computations may, for example, account for 70-80% of the total volume of computations. One or more embodiments advantageously substantially speed up the training process.

One or more embodiments further include converting the first portion of the training data from the higher-precision format to the mantissaless four-bit floating point format. The conversion into FP4 can be carried out, for example, as discussed with respect to FIG. 19, using a hardware engine. Conversion of the second portion of the training data from the higher-precision format into INT4 or the like can be carried out, for example, using well-known uniform quantization techniques implemented in hardware, as will be apparent to the skilled artisan given the teachings herein.

On or more embodiments further include using the deployed neural network, trained on the first and second portions of the training data, to detect at least one pattern in test data and make at least one prediction therefrom. Neural networks trained using aspects of the invention can be used for any application for which neural networks are suitable, including, but not limited to fault detectors and simulations for physical systems, aircraft control systems, automotive guidance systems, electronic chip failure analysis, machine vision, analysis and/or control of manufacturing systems, control of robotics, control of telecommunications systems, pattern recognition, speech recognition, and the like.

In one or more embodiments, in the converting, the mantissaless four-bit floating point format includes a mantissaless four-bit radix-4 floating point format. In some such embodiments, in the converting step, the higher-precision format includes a radix-2 32-bit floating point format.

In one or more embodiments, the training includes back propagation, the first portion of the data includes an activation gradient matrix, and the second portion of the data includes a weight matrix (the result here can be the activation matrix).

In some instances, the training includes back propagation, the first portion of the data includes an activation gradient matrix, and the second portion of the data includes an activation matrix (the result here can be the weight matrix).

Recalling the "even" case, in some instances, the three exponent bits correspond to eight levels including 0, $2^{-6}$, $2^{-4}$, $2^{-2}$, $2^0$, $2^2$, $2^4$, and $2^6$. In some such instances, the converting further includes assigning numbers larger than $2^6$ to $2^6$ and numbers smaller than $2^{-6}$ to zero. Further, in some such instances, the converting further includes assigning numbers between any given pair of the levels $2^{-6}$, $2^{-4}$, $2^{-2}$, $2^0$, $2^2$, $2^4$, and $2^6$ to a next lower one of the levels. Recalling the "bias" approach, in some embodiments, the converting further includes multiplying the data in the higher-precision format by a shift bias prior to assigning the numbers between any given pair of the levels $2^{-6}$, $2^{-4}$, $2^{-2}$, $2^0$, $2^2$, $2^4$, and $2^6$ to the next lower one of the levels; the shift bias can be 1.6 or any other suitable empirical value.

In some cases, in the converting, the mantissaless four-bit floating point format includes a mantissaless four-bit radix-4 floating point format, and the converting further includes stochastically rounding a radix-two exponent to radix-4; refer, e.g., to FIG. 4 and accompanying text. For example, the stochastic rounding can include assigning a first base-two exponent to a first value in the higher-precision format, the exponent being within a range from $a_1$ to $a_1$ plus two; generating a first random number in a random number range; and, responsive to a predetermined function (see, e.g., FIGS. 4 and 5—the predetermined function has a range coextensive with the random number range) of the first base two exponent less $a_1$ being greater than the first random number, rounding the first value in the higher-precision format up. Refer to FIG. 4 and accompanying text. The notation "$a_1$" is adopted (and "$a_2$" is used below) since there is a different "a" for each high-precision number. The stochastic rounding can further include assigning a second base-two exponent to a second value in the higher-precision format, the exponent being within a range from $a_2$ to $a_2$ plus two; generating a second random number in the random number range; and, responsive to the predetermined function of the second base two exponent less $a_2$ being greater than the second random number, rounding the second value in the higher-precision format down. In a non-limiting example, the random number range is from zero to one, compatible with the function F(x) shown in FIGS. 4 and 5, which ranges from zero to one. If the range of F(x) is 0-2 then the random number ranges from 0-2, and so on.

Given the teachings herein, the skilled artisan can implement stochastic rounding in hardware. Referring to FIG. 4, the logic therein can be implemented in hardware using known techniques. The exemplary F(x) is non-limiting, and other functions could be used instead (e.g. a step function).

Recalling the "odd" case, in some instances, the three exponent bits correspond to eight levels including 0, $2^{-7}$, $2^{-5}$, $2^{-3}$, $2^{-1}$, $2^1$, $2^3$, and $2^5$. In some such instances, the converting further includes assigning numbers larger than $2^5$ to $2^5$ and numbers smaller than $2^{-7}$ to zero. Further, in some such instances, the converting further includes assigning numbers between any given pair of the levels $2^{-7}$, $2^{-5}$, $2^{-3}$, $2^{-1}$, $2^1$, $2^3$, and $2^5$ to a next lower one of the levels. Recalling the "bias" approach, in some embodiments, the converting further includes multiplying the data in the higher-precision format by a shift bias prior to assigning the numbers between any given pair of the levels $2^{-7}$, $2^{-5}$, $2^{-3}$, $2^{-1}$, $2^1$, $2^3$, and $2^5$ to the next lower one of the levels; the shift bias can be 1.6 or any other suitable empirical value.

In some instances, the converting includes converting a first sub-portion of the first portion of the training data from the higher-precision format to an even phase of the mantissaless four-bit floating point format and converting a second sub-portion of the first portion of the training data from the higher-precision format to an odd phase of the mantissaless four-bit floating point format. See, e.g., FIG. 10 and accompanying text.

In some cases, in DNN training, use the gradients rounded by one phase for back propagating the activation gradients, and the same gradients rounded by the other phase for calculating the weight gradients to update the model. For example, during training, multiply the gradient FP4 by the weight INT4 and multiply the activation INT4 by the gradient FP4. Different orders of multiplication (i.e. multiplicand and multiplier) can be used as appropriate (e.g. order can be reversed when matrix is transposed).

Referring to FIG. 21, an exemplary apparatus includes a memory (e.g. 30); a non-transitory computer readable medium (e.g. 34) including computer executable instructions; and at least one processor 16, coupled to the memory and the non-transitory computer readable medium, and operative to execute the instructions. As discussed elsewhere herein, such an apparatus can have special processing elements as discussed herein and be used for training and/or implementation; such a unit could be used for implementation of a network trained elsewhere in which case it could have a conventional processing unit 16 or a processing unit specialized for neural network implementation/inferencing. A general purpose computer can also implement and/or control aspects of an exemplary design process used in semiconductor design, manufacture, and/or test as discussed below.

Thus, FIG. 21 depicts a computer system/server 12, which can execute computer system executable instructions, such as program modules. Generally, program modules may include routines, programs, objects, components, logic, data structures, and so on that perform particular tasks or implement particular abstract data types. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below memory 28 may include at least one program product having a set (e.g., at least one) of program modules that are configured, for example, to facilitate training and/or implementation of a neural network.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally facilitate training and/or implementation of a neural network as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

The system of FIG. 21 thus includes, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 21) running a server program. It will be understood that such a physical server may or may not include a display and keyboard. Again, it is to be emphasized that system 12 is generally representative of a specialized machine for training (which could also be used for implementation), where processor 16 includes elements 297, 299 arranged as in FIG. 18; a general-purpose machine for implementation of a trained network, where processor 16 is conventional; or a specialized machine for implementation of a trained network, where processor 16 is specialized for implementation.

Exemplary Design Process Used in Semiconductor Design, Manufacture, and/or Test

One or more embodiments of hardware in accordance with aspects of the invention can be implemented using techniques for semiconductor integrated circuit design simulation, test, layout, and/or manufacture. In this regard, FIG. 22 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 22 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer.

When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like as disclosed herein. In one embodiment, design structure 790 may comprise a compiled, executable HDL simulation model that functionally simulates the devices disclosed herein.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein. Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a floating-point gradient register;
   an integer register;
   a memory bank; and
   an array of processing units having M rows and N columns, each of said processing units in turn comprising:
   a plurality of binary shifters, each having an integer input configured to obtain corresponding bits of a 4-bit integer multiplicand, a shift-specifying input configured to obtain corresponding bits in an exponent field of a 4-bit floating point multiplier, the multiplier being specified in a mantissaless four-bit floating point format comprising a sign bit, three exponent bits, and no mantissa bits, and an output;
   an adder tree having a plurality of inputs coupled to said outputs of said plurality of shifters, and having an output; and
   a rounder having an input coupled to said output of said adder tree and having an output;
   wherein:

said integer inputs of said processing units are connected to said integer register;

said shift-specifying inputs of said processing units are connected to said floating-point gradient register; and said outputs of said rounders are coupled to said memory bank.

2. The apparatus of claim 1, further comprising a conversion unit between said outputs of said rounders and said memory bank.

3. The apparatus of claim 2, further comprising an activation function unit between said outputs of said rounders and said conversion unit.

4. The apparatus of claim 3, wherein said processing units are configured to perform multiplication of said multiplicand and said multiplier using only said plurality of binary shifters, and without use of digital multiplier circuits.

5. The apparatus of claim 4, wherein said rounders are configured to output integer numbers.

6. The apparatus of claim 4, wherein said each of said rounders further comprises a normalizer and a pack circuit, and wherein said rounders are configured to output floating-point numbers.

7. The apparatus of claim 6, wherein each of said rounders comprises:
a normalizer-rounder having said input of said rounder, an exponent output, a sign output, and a mantissa output;
a pack circuit having an exponent input, a sign input coupled to said sign output of said normalizer-rounder, and a mantissa input coupled to said mantissa output of said normalizer-rounder;
a multiplexer having an even input coupled to said exponent output of said normalizer-rounder, an odd input, an output coupled to said exponent input of said pack circuit, and an even/odd phase select input, said multiplexer being configured to select, for output to said pack circuit, said even input when said phase select input is a first value and said odd input when said phase select input is a first value; and
a decrementer coupled between said exponent output of said normalizer-rounder and said odd input of said multiplexer, said decrementer being configured to decrement an input by one.

8. The apparatus of claim 1, wherein M=1.

9. The apparatus of claim 1, wherein said outputs of said binary shifters comprise 16-bit outputs, and said output of said adder tree comprises a sixteen+$\log_2$(n) bit output, where n is a number of said binary shifters.

10. The apparatus of claim 1, wherein said floating-point gradient register contains values for a neural network activation gradient matrix, and said integer register contains values for a neural network weight matrix.

11. The apparatus of claim 1, wherein said floating-point gradient register contains values for a neural network activation gradient matrix, and said integer register contains values for a neural network activation matrix.

12. A processing element comprising:
a plurality of binary shifters, each having an integer input configured to obtain corresponding bits of a 4-bit integer multiplicand, a shift-specifying input configured to obtain corresponding bits in an exponent field of a 4-bit floating point multiplier, the multiplier being specified in a mantissaless four-bit floating point format comprising a sign bit, three exponent bits, and no mantissa bits, and an output;
an adder tree having a plurality of inputs coupled to said outputs of said plurality of shifters, and having an output; and
a rounder having an input coupled to said output of said adder tree and having an output.

13. The processing element of claim 12, wherein said apparatus is configured to perform multiplication of said multiplicand and said multiplier using only said plurality of binary shifters, and without use of digital multiplier circuits.

14. The processing element of claim 13, wherein said rounder is configured to output an integer number.

15. The processing element of claim 13, wherein said rounder further comprises a normalizer and a pack circuit, and wherein said rounder is configured to output a floating-point number.

16. The processing element of claim 15, wherein said rounder comprises:
a normalizer-rounder having said input of said rounder, an exponent output, a sign output, and a mantissa output;
a pack circuit having an exponent input, a sign input coupled to said sign output of said normalizer-rounder, and a mantissa input coupled to said mantissa output of said normalizer-rounder;
a multiplexer having an even input coupled to said exponent output of said normalizer-rounder, an odd input, an output coupled to said exponent input of said pack circuit, and an even/odd phase select input, said multiplexer being configured to select, for output to said pack circuit, said even input when said phase select input is a first value and said odd input when said phase select input is a first value; and
a decrementer coupled between said exponent output of said normalizer-rounder and said odd input of said multiplexer, said decrementer being configured to decrement an input by one.

17. The processing element of claim 12, wherein said outputs of said binary shifters comprise 16-bit outputs, and said output of said adder tree comprises a sixteen+$\log_2$(n) bit output, where n is a number of said binary shifters.

18. A hardware description language (HDL) design structure encoded on a non-transitory machine-readable data storage medium, said HDL design structure comprising elements that when processed in a computer-aided design system generates a machine-executable representation of an apparatus, wherein said (HDL design structure) comprises:
a floating-point gradient register;
an integer register;
an activation function unit; and
an array of processing units having M rows and N columns, each of said processing units in turn comprising:
a plurality of binary shifters, each having an integer input comprising corresponding bits of a 4-bit integer multiplicand, a shift-specifying input comprising corresponding bits in an exponent field of a 4-bit floating point multiplier, the multiplier being specified in a mantissaless four-bit floating point format comprising a sign bit, three exponent bits, and no mantissa bits, and an output;
an adder tree having a plurality of inputs coupled to said outputs of said plurality of shifters, and having an output; and
a rounder having an input coupled to said output of said adder tree and having an output;
wherein:
said integer inputs of said processing units are connected to said integer register;

said shift-specifying inputs of said processing units are connected to said floating-point gradient register; and said outputs of said rounders are connected to said activation function unit.

* * * * *